US010503274B2

(12) United States Patent
Seo et al.

(10) Patent No.: US 10,503,274 B2
(45) Date of Patent: *Dec. 10, 2019

(54) FLEXIBLE DISPLAY APPARATUS AND DISPLAY METHOD THEREOF

(71) Applicant: SAMSUNG ELECTRONICS CO., LTD., Suwon-si, Gyeonggi-do (KR)

(72) Inventors: Joon-kyu Seo, Seongnam-si (KR); Jung-joo Sohn, Seoul (KR); Hyun-jin Kim, Seoul (KR); Geun-ho Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,568

(22) Filed: Feb. 21, 2019

(65) Prior Publication Data

US 2019/0179425 A1 Jun. 13, 2019

Related U.S. Application Data

(63) Continuation of application No. 16/145,467, filed on Sep. 28, 2018, now Pat. No. 10,275,045, which is a (Continued)

(30) Foreign Application Priority Data

Jul. 30, 2012 (KR) .................. 10-2012-0083285

(51) Int. Cl.
*G06F 3/033* (2013.01)
*G06F 3/041* (2006.01)
(Continued)

(52) U.S. Cl.
CPC ............ *G06F 3/033* (2013.01); *G06F 1/1652* (2013.01); *G06F 3/017* (2013.01); *G06F 3/03* (2013.01);
(Continued)

(58) Field of Classification Search
CPC .......... G06F 3/033; G06F 3/0418; G06F 3/03; G06F 3/0487; G06F 1/1652; G06F 3/017;
(Continued)

(56) References Cited

U.S. PATENT DOCUMENTS 7,456,823 B2 11/2008 Poupyrev
8,654,075 B2 2/2014 Kim
(Continued)

FOREIGN PATENT DOCUMENTS

CN 101674361 A 3/2010
CN 101788850 A 7/2010
(Continued)

OTHER PUBLICATIONS

Chinese Office Action dated Jul. 2, 2018 in Chinese Patent Application No. 201310325966.8.
(Continued)

*Primary Examiner* — Muhammad N Edun
(74) *Attorney, Agent, or Firm* — Staas & Halsey LLP

(57) ABSTRACT

A flexible display apparatus includes a flexible display, a sensor which senses bending of the flexible display, and a controller which determines a screen activation region and a screen inactivation region from among a plurality of display regions of the flexible display based on the sensed bending, and displays a predetermined screen on the screen activation region.

13 Claims, 32 Drawing Sheets

Related U.S. Application Data continuation of application No. 15/857,743, filed on Dec. 29, 2017, now Pat. No. 10,114,476, which is a continuation of application No. 15/255,623, filed on Sep. 2, 2016, now Pat. No. 9,864,438, which is a continuation of application No. 13/953,136, filed on Jul. 29, 2013, now Pat. No. 9,448,660.

(51) Int. Cl.
| | |
|---|---|
| *G06F 3/0488* | (2013.01) |
| *G06T 11/60* | (2006.01) |
| *G06F 3/0487* | (2013.01) |
| *G06F 1/16* | (2006.01) |
| *G06F 3/01* | (2006.01) |
| *G06F 3/0481* | (2013.01) |
| *G06F 3/03* | (2006.01) |
| *H04M 1/02* | (2006.01) |
| *H04M 1/725* | (2006.01) |

(52) U.S. Cl.
CPC .......... *G06F 3/0416* (2013.01); *G06F 3/0418* (2013.01); *G06F 3/0481* (2013.01); *G06F 3/0487* (2013.01); *G06F 3/0488* (2013.01); *G06T 11/60* (2013.01); *H04M 1/0268* (2013.01); *G06F 2203/04803* (2013.01); *H04M 1/72519* (2013.01)

(58) Field of Classification Search
CPC .... G06F 3/0488; G06F 3/0481; G06F 3/0416; G06F 2203/04803; H04M 1/0268; H04M 1/72519; G06T 11/60
See application file for complete search history.

(56) References Cited

U.S. PATENT DOCUMENTS

| | | | |
|---|---|---|---|
| 8,654,087 | B2 | 2/2014 | Kang et al. |
| 9,013,432 | B2 | 4/2015 | Kang et al. |
| 9,013,433 | B2 | 4/2015 | Kang et al. |
| 9,052,769 | B2 | 6/2015 | Choi et al. |
| 9,671,870 | B2 | 6/2017 | Kang et al. |
| 9,946,358 | B2 | 4/2018 | Kang et al. |
| 2004/0008191 | A1 | 1/2004 | Poupyrev et al. |
| 2008/0291225 | A1 | 11/2008 | Arneson |
| 2008/0303782 | A1 | 12/2008 | Grant et al. |
| 2010/0056223 | A1 | 3/2010 | Choi |
| 2010/0060548 | A1 | 3/2010 | Choi et al. |
| 2010/0141605 | A1 | 6/2010 | Kang et al. |
| 2010/0182265 | A1 | 7/2010 | Kim et al. |
| 2012/0133621 | A1 | 5/2012 | Kim |
| 2013/0342509 | A1 | 12/2013 | Kang et al. |
| 2014/0002402 | A1 | 1/2014 | Kang et al. |
| 2014/0292717 | A1 | 10/2014 | Kang et al. |
| 2017/0255271 | A1 | 9/2017 | Kang et al. |

FOREIGN PATENT DOCUMENTS

| | | |
|---|---|---|
| EP | 2166443 | 3/2010 |
| EP | 2565866 A1 | 3/2013 |
| KR | 10-2010-0030114 | 3/2010 |
| KR | 10-2010-0065418 | 6/2010 |
| KR | 10-2010-0081161 | 7/2010 |
| KR | 10-2012-0056512 | 6/2012 |

OTHER PUBLICATIONS

Korean Office Action dated May 20, 2018 in Korean Patent Application No. 10-2012-0083285.
U.S. Office Action dated Jan. 30, 2015 in corresponding U.S. Appl. No. 13/953,136.
U.S. Office Action dated Sep. 10, 2015 in corresponding U.S. Appl. No. 13/953,136.
U.S. Notice of Allowance dated Dec. 4, 2015 in corresponding U.S. Appl. No. 13/953,136.
U.S. Office Action dated Feb. 2, 2016 in corresponding U.S. Appl. No. 13/953,136.
U.S. Notice of Allowance dated May 19, 2016 in corresponding U.S. Appl. No. 13/953,136.
European Search Report dated Nov. 4, 2016 in related European Patent Application No. 13177749.2.
Chinese Office Action dated Dec. 5, 2016 in related Chinese Patent Application No. 201310325966.8.
Extended European Search Report dated Feb. 8, 2017 in related European Patent Application No. 13177749.2 (10 pages).
Chinese Office Action dated Sep. 18, 2017 in Chinese Patent Application No. 201310325966.8.
U.S. Notice of Allowance dated Sep. 13, 2017 in U.S. Appl. No. 15/255,623.
U.S. Notice of Allowance dated May 24, 2017 in U.S. Appl. No. 15/255,623.
U.S. Office Action dated Jan. 30, 2017 in U.S. Appl. No. 15/255,623.
U.S. Notice of Allowance dated Jun. 20, 2018 in U.S. Appl. No. 15/857,743.
U.S. Office Action dated Feb. 8, 2018 in U.S. Appl. No. 15/857,743.
U.S. Notice of Allowance dated Nov. 20, 2018 in U.S. Appl. No. 16/145,467.
U.S. Appl. No. 16/145,467, filed Sep. 28, 2018, Joon-kyu Seo, et al., Samsung Electronics Co., Ltd.
U.S. Appl. No. 15/857,743, filed Dec. 29, 2017, Joon-kyu Seo, et al., Samsung Electronics Co., Ltd, (now U.S. Pat. No. 10,114,476).
U.S. Appl. No. 15/255,623, filed Sep. 2, 2016, Joon-kyu Seo, et al., Samsung Electronics Co., Ltd, (now U.S. Pat. No. 9,864,438).
U.S. Appl. No. 13/953,136, filed Jul. 29, 2013, Joon-kyu Seo, et al., Samsung Electronics Co., Ltd, (now U.S. Pat. No. 9,448,660).
Korean Notice of Allowance dated Jul. 17, 2019 in Korean Patent Application No. 10-2018-0133125.

FIG. 9
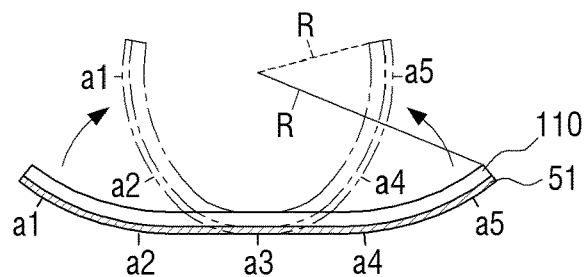
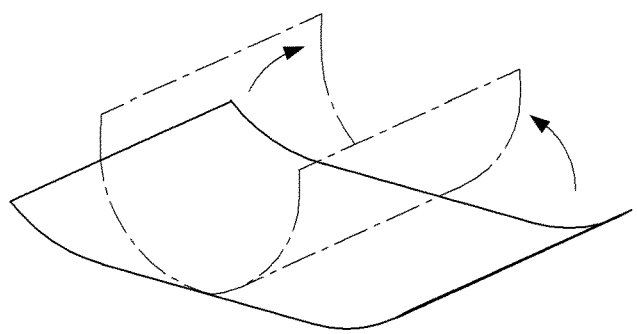
FIG. 10
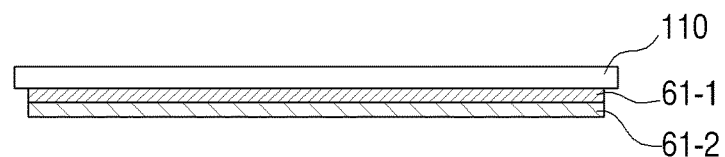

FLEXIBLE DISPLAY APPARATUS AND DISPLAY METHOD THEREOF

CROSS-REFERENCE TO RELATED APPLICATIONS

This application is a continuation of U.S. application Ser. No. 16/145,467, filed on Sep. 28, 2018, which is a continuation of U.S. application Ser. No. 15/857,743, filed on Dec. 29, 2017, now U.S. Pat. No. 10,114,476, issued Oct. 30, 2018, which is a continuation of U.S. application Ser. No. 15/255,623, filed on Sep. 2, 2016, now U.S. Pat. No. 9,864,438, issued Jan. 9, 2018, which is a continuation of U.S. application Ser. No. 13/953,136, filed on Jul. 29, 2013, now U.S. Pat. No. 9,448,660, issued Sep. 20, 2016, which claims priority from Korean Patent Application No. 10-2012-0083285, filed on Jul. 30, 2012 in the Korean Intellectual Property Office, the disclosures of which are incorporated herein by reference in their entirety.

BACKGROUND OF THE INVENTION

1. Field of the Invention

Methods and apparatuses consistent with exemplary embodiments of the present general inventive concept relate to a flexible display apparatus and a display method thereof, and more particularly, to a flexible display apparatus which can be bent, and a display method thereof.

2. Description of the Related Art

With the development of electronic technologies, various kinds of display apparatuses have been developed. In particular, display apparatuses such as television (TVs), personal computers (PCs), laptops, tablet PCs, mobile phones, and MP3 players have come into wide use to such an extent that they are used in most households.

To meet users' needs for new functions, an effort to develop the display apparatus in a new form has been made. A so-called next generation display apparatus is a result of such an effort.

The flexible display apparatus is an example of the next-generation display apparatus. The flexible display apparatus refers to a display apparatus that can be deformed or have its shape changed like paper. The flexible display apparatus can be deformed by a force applied by a user and thus may be used for various purposes. For instance, the flexible display apparatus may be used for mobile apparatuses such as mobile phones, tablet PCs, electronic albums, personal digital assistants (PDAs), and MP3 players. The flexible display apparatus has flexibility unlike existing display apparatuses. Accordingly, there is a demand for a method of using such a characteristic to control the various operations of the display apparatuses.

SUMMARY OF THE INVENTION

One or more exemplary embodiments may overcome the above disadvantages and other disadvantages not described above. However, it is understood that one or more exemplary embodiment are not required to overcome the disadvantages described above, and may not overcome any of the problems described above.

Additional features and utilities of the present general inventive concept will be set forth in part in the description which follows and, in part, will be obvious from the description, or may be learned by practice of the general inventive concept.

Exemplary embodiments of the present general inventive concept provide a flexible display apparatus which can activate or inactivate at least a part of a display region according to bending, and a display method thereof.

Exemplary embodiments of the present general inventive concept provide a flexible display apparatus including a flexible display, a sensor to sense a bending of the flexible display, and a controller to determine a screen activation region and a screen inactivation region from among a plurality of display regions of the flexible display based on the sensed bending, and display a predetermined screen on the screen activation region.

The controller may determine the screen activation region as one of the plurality of display regions that is formed by a bending line formed by the bending, and at least two of four sides of the flexible display, and may determine the remaining display regions as the screen inactivation region.

The controller may determine the screen activation region as one of the plurality of display regions that is formed by two points at which the bending line meets first and second sides of the flexible display which are adjacent to each other, and a vertex at which the first and second adjacent sides meet each other, and may determine the remaining display regions as the screen inactivation region.

The at least two sides of the flexible display may be opposite each other, and the controller may determine the screen activation region as one of the plurality of display regions that is formed by two points at which the bending line meets the two opposite sides of the flexible display, and two vertexes at which the two opposite sides meet a third side which connects the two opposite sides, and may determine the remaining display regions as the screen inactivation region.

If the bending is performed in a state in which an original screen is displayed on the entire flexible display, the controller may determine a screen activation region based on the bending, reconfigure the original screen according to a size and a shape of the screen activation region, and may display on the determined screen activation region one of the reconfigured screen and part of the original screen that corresponds to the size and shape of the determined screen activation region.

The flexible display apparatus may further include a storage device to store information on a plurality of functions and information on a priority given to the plurality of functions, and, if the screen activation region is determined, the controller may determine a number of executable functions with reference to a size and a shape of the screen activation region, may execute the determined number of functions from among the plurality of functions with reference to the priority, and may generate the screen including an object corresponding to each of the executed functions.

The priority may be determined according to a location of the screen activation region.

The flexible display apparatus may further include a storage device to store information on at least one function that matches each display region of the flexible display, and, if the screen activation region is determined, the controller may execute a function that matches a location of the screen activation region, and may generate the screen corresponding to the function.

The storage device may further store information on a priority given to each function, and, if a display region matching a plurality of functions is included in the screen activation region, the controller may determine a number of executable functions according to a size and a shape of the screen activation region, may execute the determined number of functions from among the plurality of functions in sequence according to the priority, and may generate the screen including an object corresponding to each of the executed functions.

In a state in which a first application is executed and an execution screen of the application is displayed on the entire flexible display, if a notice message regarding a second application is received, the controller may display the notice message on one display region of the execution screen, and, if the display region on which the notice message is displayed is bent, the controller may display the execution screen of the first application on a display region other than the bent display region, and may display a whole text of the notice message on the bent display region.

If flap manipulation to unfold the bent display region is sensed in the state in which the whole text of the notice message is displayed on the bent display region, the controller may execute the second application and may display an execution screen of the second application on the entire flexible display.

Exemplary embodiments of the present general inventive concept also provide a display method of a flexible display apparatus, the display method including sensing a bending of a flexible display provided in the flexible display apparatus, determining a screen activation region and a screen inactivation region from among a plurality of display regions of the flexible display based on the sensed bending, and displaying a predetermined screen on the screen activation region.

The determining the screen activation region and the screen inactivation region may include determining as the screen activation region a display region that is formed by a bending line formed by the bending, and at least two of four sides of the flexible display, and determining the remaining display regions as the screen inactivation region.

The determining the screen activation region and the screen inactivation region may include determining as the screen activation region a display region that is formed by two points at which the bending line meets first and second sides of the flexible display which are adjacent to each other, and a vertex at which the first and second adjacent sides meet each other, and determining the remaining display regions as the screen inactivation region.

The at least two sides may be opposite each other, and the determining the screen activation region and the screen inactivation region may include determining as the screen activation region a display region that is formed by two points at which the bending line meets the two opposite sides of the flexible display, and two vertexes at which the two opposite sides meet a third side which connects the two opposite sides, and determining the remaining display regions as the screen inactivation region.

The displaying the screen may include, if the bending is performed in a state in which an original screen is displayed on the entire flexible display, reconfiguring the original screen according to a size and a shape of the determined screen activation region and displaying on the determined screen activation region one of the reconfigured screen and a part of the original screen that corresponds to the size and the shape of the determined screen activation region.

The displaying the screen may include, if the screen activation region is determined, determining a number of executable functions with reference to a size and a shape of the screen activation region, executing the determined number of functions from among a plurality of functions executable in the flexible display apparatus with reference to a priority given to the plurality of functions, and generating the screen including an object corresponding to each of the executed functions, and displaying the screen on the screen activation region.

The priority may be determined according to a location of the screen activation region.

The displaying the screen may include, if the screen activation region is determined, identifying a function that matches a location of the screen activation region based on information on at least one function that matches each display region of the flexible display and is stored, and executing the identified function and generating the screen corresponding to the function, and displaying the screen on the screen activation region.

The displaying the screen may include, if a display region matching a plurality of functions is included in the screen activation region, determining a number of executable functions according to a size and a shape of the screen activation region, executing the determined number of functions from among the plurality of functions in sequence according to a priority given to the plurality of functions, and generating the screen including an object corresponding to each of the executed functions, and displaying the screen on the screen activation region.

Exemplary embodiments of the present general inventive concept also provide a non-transitory computer-readable recording medium to contain computer-readable codes to execute the display method of a flexible display apparatus.

The controller of the flexible display apparatus may determine a brightness of the screen activation region based on the bending.

Exemplary embodiments of the present general inventive concept also provide a flexible display apparatus, including a flexible display, and a controller to determine at least one of a shape, size, location, and content of a screen activation region of the flexible display based on a bending of the flexible display.

The controller may display an image on the screen activation region, and the controller may change at least one of a size and content of the image according to the bending of the flexible display.

The image may correspond to an application of the flexible display apparatus, and the controller may control the application according to the bending of the flexible display.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 9 is a view illustrating a method of determining a degree of bending according to an exemplary embodiment of the present general inventive concept;

FIGS. 10 and 11 are views illustrating a method of sensing a bending direction using overlapping bending sensors;

DETAILED DESCRIPTION OF THE EMBODIMENTS

Figure 1:
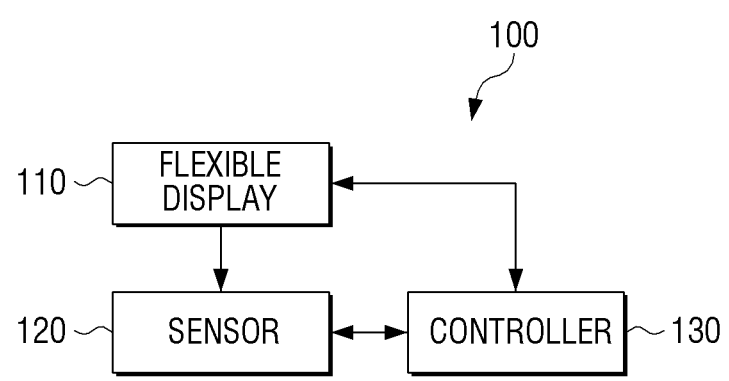
FIG. 1 is a block diagram illustrating a flexible display apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined herein, such as detailed construction and elements, are provided to assist in a comprehensive understanding of exemplary embodiments of the present general inventive concept. Thus, it is apparent that exemplary embodiments of the present general inventive concept can be carried out without those specifically defined matters. Also, functions or elements known in the related art are not described in detail since they would obscure the exemplary embodiments with unnecessary detail.

FIG. 1 is a block diagram illustrating a flexible display apparatus 100 according to an exemplary embodiment of the present general inventive concept. Referring to FIG. 1, a flexible display apparatus 100 includes a flexible display 110, a sensor 120, and a controller 130.

The flexible display 110 displays a screen. The flexible display apparatus 100 including the flexible display 110 can be bent. Accordingly, the flexible display 110 should have a bendable structure and be made of a material that can be bent. The flexible display 110 will be explained in detail below with reference to FIG. 2.

The sensor 120 may sense bending of the flexible display 110. Specifically, the sensor 120 may recognize a bending/folding location, a bending/folding direction, a bending/folding angle, a degree of bending/folding, a bending/folding speed, a number of times that bending/folding is performed, a bending/folding generating time, and a bending/folding holding time. The sensor 120 may include a bend sensor or a pressure sensor (illustrated in FIGS. 3-14, discussed later).

The sensor 120 may recognize a degree of bending by measuring a radius of curvature (R) at a bending location based on a change in distribution of a resistance value output from the bend sensor or distribution of pressure sensed by the pressure sensor.

Also, the sensor 120 may recognize a bending speed based on a change in a bending location and a change in a degree of bending sensed based on a change in distribution of a resistance value output from the bend sensor or distribution of pressures sensed by the pressure sensor.

The sensor 120 may sense a change in a bending state. Specifically, the sensor 120 may recognize a change in the bending/folding location, a change in the bending/folding direction, a change in the bending/folding angle, and a change in the degree of bending/folding.

The controller 130 determines a screen activation region and a screen inactivation region of a display region of the flexible display 110 based on bending sensed by the sensor 120. Specifically, the controller 130 may discriminate between a screen activation region and a screen inactivation region based on a bending line BL which is formed by bending.

The controller 130 may detect a bending line BL based on a change in distribution of a resistance value output from the bend sensor of the sensor 120, or a change in distribution of pressure sensed by the pressure sensor of the sensor 120. The bending line BL recited herein may refer to a point at which the greatest degree of bending occurs on a bent area. For example, a virtual line connecting bending points (or bending coordinates) at which the greatest resistance value is output from the bend sensor may be detected as a bending line BL. Also, if the bend sensor is implemented by using sensors separately located at a plurality of points (for example, strain gages), the bending point may be a point at which each sensor is located, and a virtual line connecting sensors that output the greatest resistance values may be a bending line BL.

The controller 130 displays a screen on the determined screen activation region, and converts the screen inactivation region into a standby state. The screen standby state may refer to a screen turn-off state, a screen lock state, or a security screen state. The screen off state refers to a state in which a screen is turned off and input using information displayed on the screen is not possible. The screen lock state refers to a state in which the screen is turned on, but use of the other functions is not allowed unless a designated input is performed. The security screen state refers to a state in which the user should perform a designated input in order to enter a screen activation state.

For example, in the case of an organic light emitting diode (OLED), each pixel includes a light emitting element and thus can be turned on/off on a pixel basis. If power is not supplied to the light emitting element of the OLED, a black screen is displayed and thus the screen inactivation region may be displayed as black.

In the case of an LCD, a backlight unit of a grid pattern, which is turned on/off on a grid basis, is employed in order to process the screen inactivation region. Besides this, various methods of controlling the backlight unit according to a region may be applied.

In some situation, the controller 130 may convert a state of the inactivation region into a turn off state. The turn off state refers to a state in which power is turned off and all input and output are stopped.

In the above example, the inactivation state is one selected from among the turn off state, the screen off state, the screen lock state, and the security screen state. However, this is merely an example. Two or more states may be embodied simultaneously. For example, the screen off state and the security screen state may be applied in the inactivation state simultaneously.

If a bending/folding operation sensed by the sensor 120 satisfies a predetermined condition, the controller 130 may recognize the sensed operation as an operation to convert the screen inactivation region into the screen activation region.

Specifically, the controller 130 may convert the screen inactivation region into the screen activation region if a bending operation is performed at a designated location, if a bending operation is performed at a designated location by more than a designated angle, if a continuous bending operation is performed at a designated location a designated number of times, if a bending operation is performed at a designated location in a designated direction, if a bending operation is performed at a designated location at higher than a designated speed or with greater than a designated degree of bending, or if a bending operation is maintained at a designated location for more than a predetermined time.

For example, the user may fold the flexible display apparatus 100 in half when the flexible display apparatus 100 is not in use. In this case, the operation of folding the flexible display apparatus 100 in half may be stored so that this operation is not recognized as an operation to convert the screen inactivation region into the screen activation region.

If the sensor 120 to sense bending is inactivated in the turn off state or the screen off state, and if bending by more than a predetermined angle/greater than a predetermined degree is input, the controller 130 automatically recognizes generation of a current caused by bending, and activates the sensor 120 to recognize bending.

Also, the controller 130 may activate the sensor 120 in the inactivation state according to a user command input through a specific button (not illustrated).

The controller 130 may perform a different function for a region that is converted into the screen activation state according to a type of the screen inactivation state. For example, the controller 130 may display an application icon in the screen lock state, and, if a certain region is converted into the activation state according to bending, the controller 130 may display the application icon on the activated region. However, this is merely an example. The controller 130 may display a background image and an object separate from the background image in the screen lock state.

If an execution screen of an application corresponding to the screen activation region is larger than the screen activation region, the controller 130 may display an execution screen of another application corresponding to the size of the activation region.

Also, if a graphic user interface (GUI) element displayed on the screen activation region is moved in a bending direction, the controller 130 may execute an application that is placed on a region to which the GUI element is moved. For example, if the GUI element is moved in a state in which a plurality of application icons are displayed on the screen activation region, the GUI element may overlap with a specific application icon, or may be located within a predetermined distance from the specific application icon. In this case, an application corresponding to the specific application icon may be executed.

Determining a Screen Activation Region

The controller 130 may determine one of a plurality of display regions that is formed by a detected bending line BL and at least two of the four sides of the flexible display 110 as a screen activation region, and may determine the remaining display regions as a screen inactivation region.

Figure 23A:
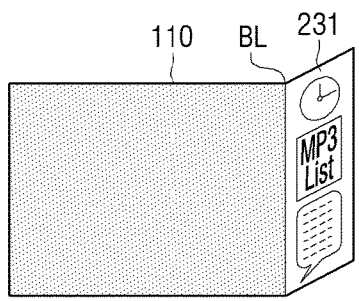
FIGS. 23A-E are views illustrating a method of displaying according to a shape of a screen activation region according to an exemplary embodiment of the present general inventive concept.
Figure 23B:
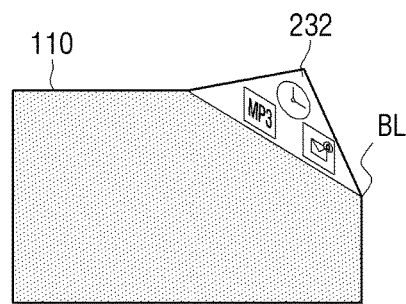

For example, the controller 130 may determine a region that is formed by two points at which a detected bending line BL meets first and second sides of the flexible display 110 which are adjacent to each other, and a vertex at which the first side and the second side meet each other, as a screen activation region, and may determine the other region as a screen inactivation region. An example of this situation is illustrated in FIG. 23B, discussed later, illustrating screen activation region 232.

Also, the controller 130 may determine a region that is formed by two points at which a bending line BL meets two opposing sides of the flexible display 110, and two vertexes at which the two opposing sides meet a third side connecting the two opposing sides, as a screen activation region, and may determine the remainder of the flexible display 110 as a screen inactivation region. An example of this situation is illustrated in FIG. 23A, discussed later, illustrating screen activation region 231.

Figure 22A:
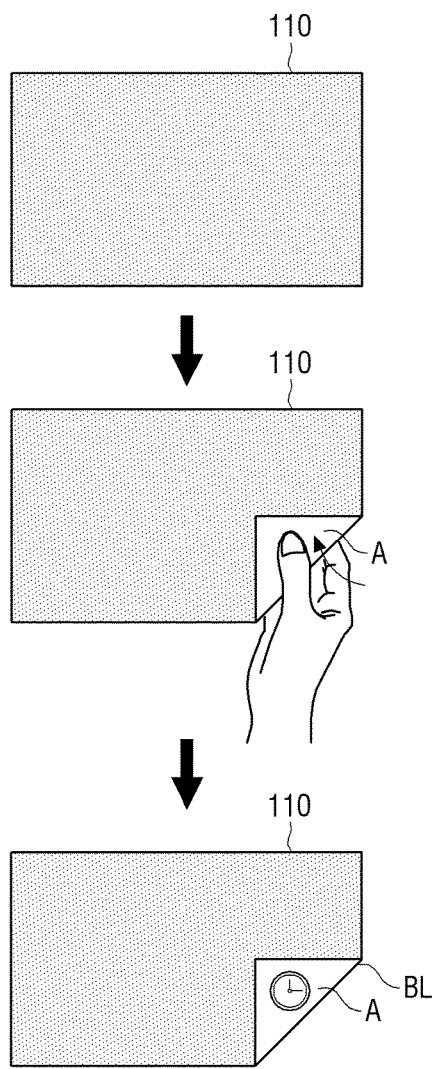
FIGS. 22A-B are views illustrating a method of displaying a screen on an activation region according to a bending manipulation method according to an exemplary embodiment of the present general inventive concept.
Figure 22B:
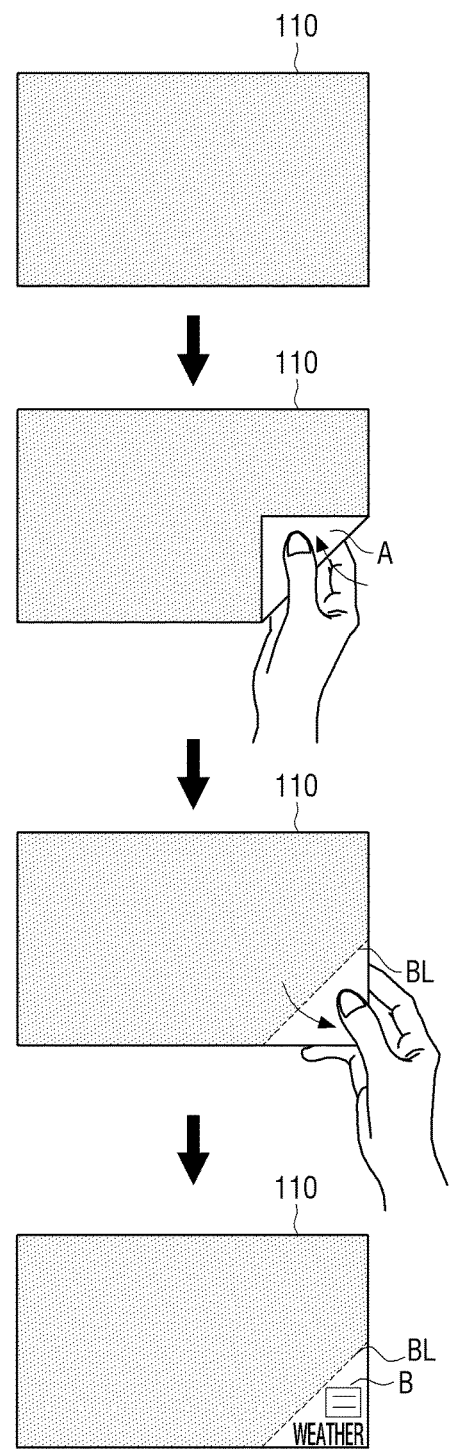

The controller 130 may determine a location movement of a display region which is sensed by a bending operation from among the display regions of the flexible display 110 divided with reference to a bending line BL as a screen activation region, and may determine the remainder of the flexible display 110 as a screen inactivation region. Specifically, the controller 130 may determine at least one of a location movement of a region which is sensed by a folding and hold operation, a location movement of a region which is sensed by a folding and flap operation, and the other region which contacts the region the location movement of which is sensed by the folding and flap operation, as a screen activation region. Examples of this situation are illustrated in FIGS. 22A and 22B, discussed later, illustrating screen activation regions A and B, respectively.

Figure 20A:
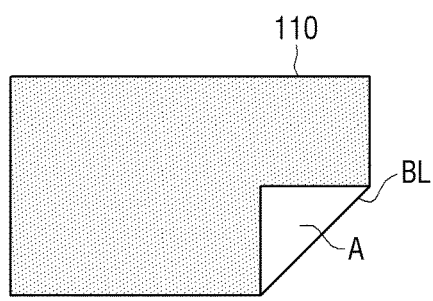
FIGS. 20A-D are views illustrating a method of determining an activation region according to an exemplary embodiment of the present general inventive concept.

The region the location movement of which is sensed by the folding and hold operation may be a front surface or a rear surface of the flexible display 110. If the region the location movement of which is sensed by the folding and hold operation is a rear surface, the flexible display 110 may be embodied as a double-sided display. An example of this situation is illustrated in FIG. 20A, discussed later, illustrating screen activation region A.

Detailed examples of determining the screen activation region and the screen inactivation region will be explained below with reference to the drawings.

Display on an Activation Region

The controller 130 may determine a screen activation region corresponding to bending, and may display a screen corresponding to the determined screen activation region. For example, the controller 130 may place a (0.0) point on an edge or a corner which is gripped by the user to be bent, and to activate graphics from the (0.0) point to a portion where a bending line BL is formed. The controller 130 may display information which is optimized to the size of the determined screen activation region.

Specifically, the controller 130 may rescale an image according to the size of the screen activation region using vector graphic technology, and may display the image. That is, in a GUI of the vector graphic technology, an image is not damaged even if the size of the image is changed. Therefore, the controller 130 may rescale the image and display information optimized to the size of the screen activation region.

If text information is displayed, the controller 130 may optimize the text information to the size of the screen activation region by adjusting the number of text lines and the number of texts included in one line. The controller 130 may change a text size according to the screen activation region. For example, the controller 130 may change the text size within a predetermined minimum size and within a predetermined maximum size.

The controller 130 may rearrange and display contents corresponding to the screen activation region considering a shape and a location of the screen activation region and a direction of a bending line BL.

The controller 130 may convert corresponding contents into various layouts considering a tilting angle of the flexible display apparatus 100 as well as the shape of the screen activation region of the flexible display apparatus 100. For example, since there is a shaded region due to an angle of view if a bending region is activated, brightness of the display may be automatically adjusted considering a bending angle.

The controller 130 may convert corresponding contents into various layouts considering a radius of curvature (R) generated by bending. For example, since a layout shape suitable for a user's view field considering content readability may vary according to a radius of curvature (R), a suitable layout may be provided considering a bending angle.

If the screen activation region is determined, the controller 130 may display information on a function having highest priority from among a plurality of functions on the determined screen activation region. Specifically, the controller 130 may display a widget of highest priority or an application that is frequently used on the screen activation region. The priority may be determined according to the number of times that an application is used and a using time. For example, information of an application in which clock, weather, or news clip is received, a button of a frequently used application, and information on a recently used application may be displayed. In particular, in the case of a message application, only the last-received message information may be displayed on the activation region. If there are many message texts, the message texts may be changed at predetermined time intervals, or if there is user manipulation on the screen activation region (for example, touch or touch and drag), information may be changed.

Specifically, the controller 130 determines the number of executable functions according to the size and the shape of the determined screen activation region, executes functions as many as the determined number from among the plurality of functions according to priority, and generates a screen including an object corresponding to each of the executed functions. In this case, information on the plurality of functions and information on priority given to the plurality of functions may be pre-stored or may be received from an external source. Also, the priority may be determined differently according to a location of the activation region.

Information on at least one function matching each region of the flexible display 110 may be pre-stored, and, if the screen activation region is determined, the controller 130 may execute a function matching a location of the screen activation region and may generate a screen. In this case, information on priority given to each function may be further stored, and, if a region matching a plurality of functions is included in the activation region, the controller 130 determines the number of functions to be executed according to the size and the shape of the screen activation region, executes the determined number of functions from among the plurality of functions in sequence according to the priority or simultaneously, and generates a screen including an object corresponding to each of the executed functions.

If the screen is in a standby state but a specific application is being executed, the controller 130 may execute a designated function on the screen activation region formed by bending. The designated function may be a function that is related to the application being executed, or may be a basic function such as a notice function, an RSS Feed check function, a clock function, a calendar function, a schedule function, and application notification information. For example, if a specific application is being executed on a standby background screen, a sub-function of the application which is being executed may be executed on the screen activation region by bending, or another relevant application may be executed. That is, if music is reproduced, a music control button may be displayed, and, if a network is connected, a disconnect button may be displayed. The designated function may be a function that is already set by the user. For example, the user may map a photo application onto the screen activation region. In this case, a pre-stored photo, a photo added to an SNS, or a photo popular on the internet may be automatically reproduced on the screen activation region.

The controller 130 may display a screen to release a lock state on the screen activation region. For example, if a button is displayed on the screen activation region, a password is input, and bending is released, the flexible display 110 may be activated, or, if bending is released in a state in which at least one touch is performed on the screen activation region, the flexible display 110 may be activated. In this case, a GUI to induce or guide touch may be displayed on the screen activation region.

If there is application notification information that is not checked, the controller 130 may display the notification information on the activation region along with information on a corresponding application in a format of a text.

If there is multi-bending, the controller 130 may display screens corresponding to a plurality of activation regions determined by the multi-bending.

If a certain region is bent while in a state in which a screen has been activated, the controller 130 may change the corresponding bent region to a different screen.

Figure 30:
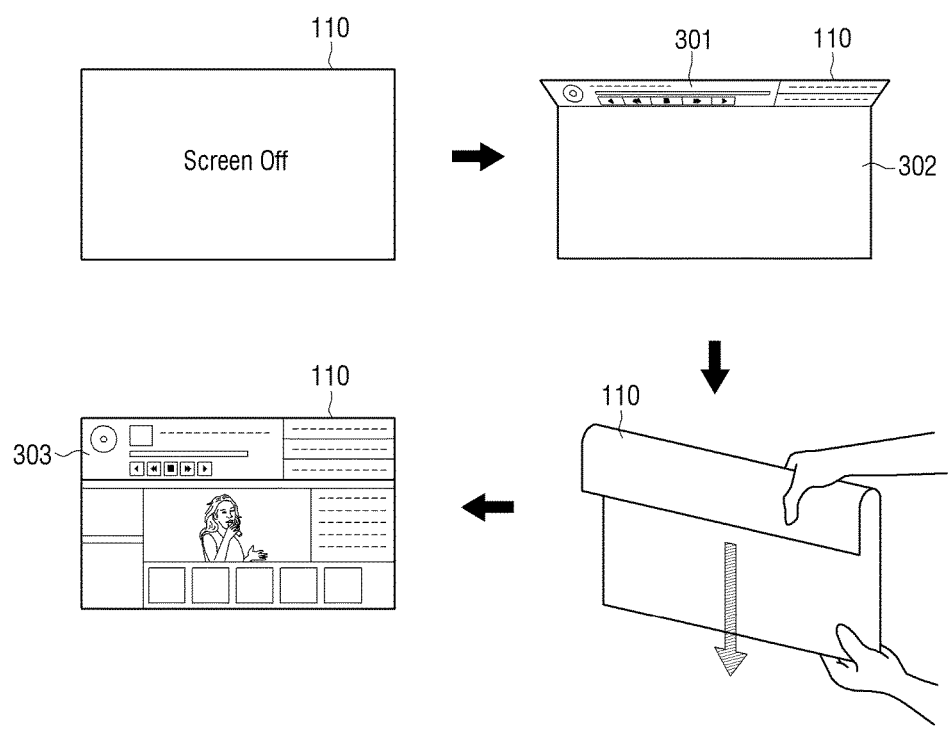
FIG. 30 is a view illustrating a display method according to an exemplary embodiment of the present general inventive concept.

If bending is performed while in a state in which an original screen is displayed on an entire activation region of the flexible display 110, the controller 130 may reconfigure the original screen according to the size and the shape of the screen activation region following the bending, and may display the reconfigured screen on the activation region. An example of this situation is illustrated in FIG. 30, discussed later.

Figure 33:
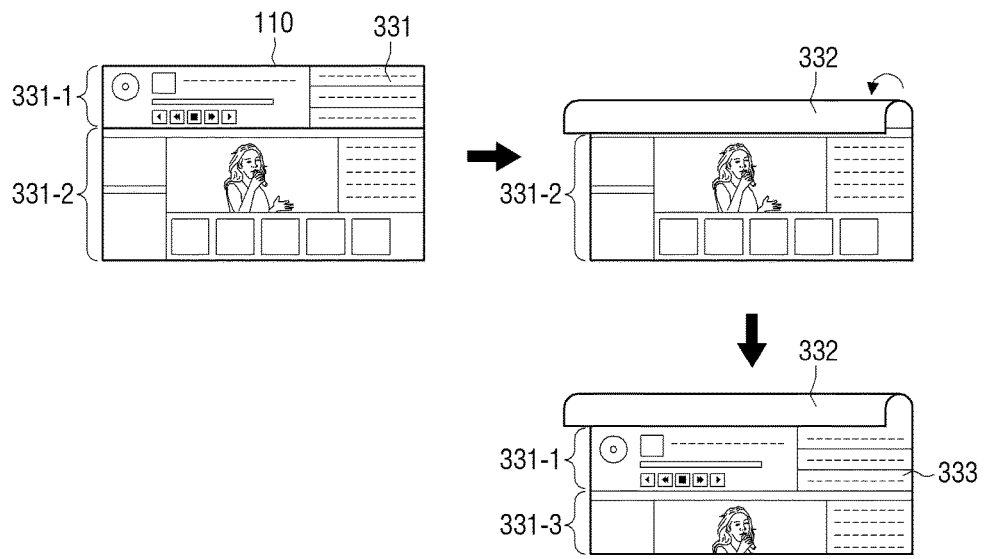
FIGS. 33 and 34 are views illustrating a method of inactivating a screen according to an exemplary embodiment of the present general inventive concept.

Also, if bending is performed while in a state in which an original screen is displayed on the entire activation region of the flexible display 110, the controller 130 may display a part of the original screen that corresponds to the size and the shape of the original screen activation region on the activation region following the bending. An example of this situation is illustrated in FIG. 33, discussed later.

Also, in a state in which one application is executed and an execution screen of the application is displayed on the entire flexible display 110, if a notice message regarding a second application is received, the notice message may be displayed on a certain region of the execution screen, as illustrated for example in FIGS. 26 and 27, discussed later.

If the region on which the notice message is displayed is bent, the controller 130 may display a whole text of the notice message on the bent region, while displaying the execution screen of the application on the remainder of the activation region of the flexible display 110. An example of this situation is illustrated in FIG. 26.

If flap manipulation to unfold the bent region is sensed in the state in which the whole text of the notice message is displayed on the bent region, the controller 130 executes the second application and displays an execution screen of the second application on the entire activation region of the flexible display 110 following the flap manipulation. An example of this situation is illustrated in FIG. 27, discussed later.

If the flexible display apparatus 100 is re-bent in the state in which the execution screen of the second application is displayed on the entire activation region of the flexible display 110, the controller 130 may execute a sub-function corresponding to the re-bent region from among sub-functions executable by the second application. An example of this situation is illustrated in FIG. 27, discussed later.

If the flexible display apparatus 100 is re-bent in a direction opposite to the bending direction of the region on which the notice message is displayed, the controller 130 may delete the displayed notice message and may display the execution screen of the first application on the entire region of the flexible display 110 again, as illustrated for example in FIG. 26, discussed later.

Figure 32A:
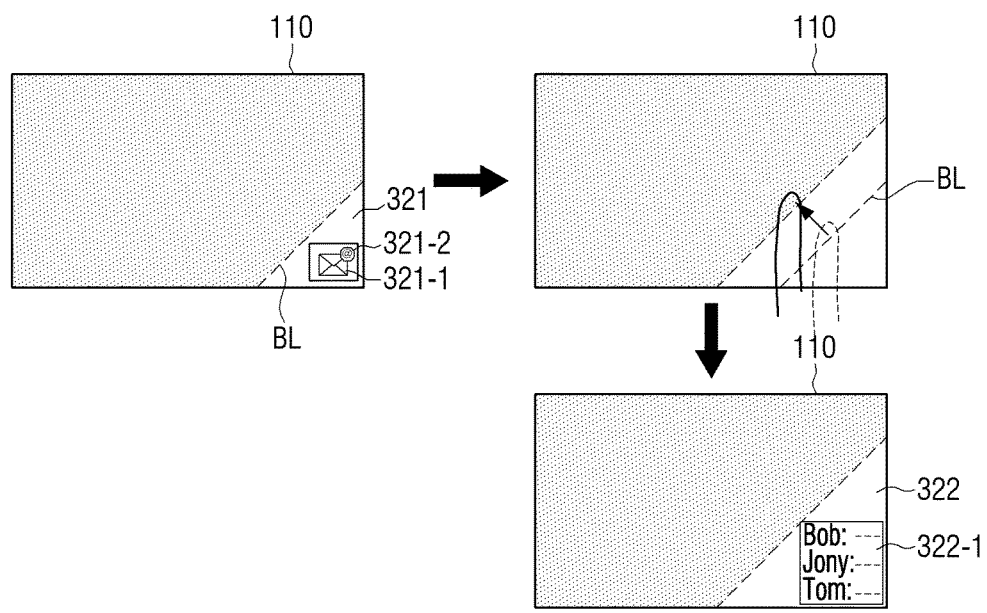
FIGS. 32A-B are views illustrating a method of displaying according to an adjusted screen activation region according to an exemplary embodiment of the present general inventive concept.
Figure 32B:
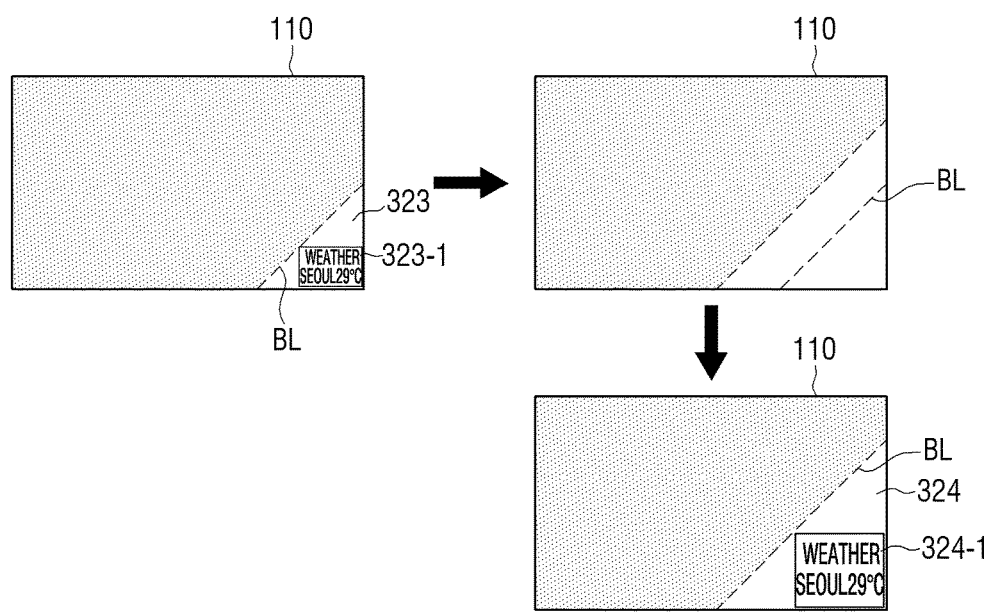

Also, the controller 130 may display different information according to a location of a bent region. For example, if a corner of the flexible display 110 is bent, the controller 130 may display a widget which is displayed as an image such as watch or weather information rather than text-based information, and, if a text needs to be displayed, may display the text of more than one line on a location adjacent to the bending line BL. Examples of this situation are illustrated in FIGS. 32A and 32B, discussed later.

If the bent region returns to a flat state, the controller 130 may enter the standby state, as illustrated for example in FIG. 28, discussed later.

Extending a Screen Action Region

If the flexible display 110 is bent such that one end contacts the opposite end and then returns to an original flat state, the controller 130 may extend a screen activation region to an entire region of the flexible display 110.

The controller 130 determines a screen activation region and a screen inactivation region with reference to a bending line BL, and, if touching a location of the bending line BL and dragging to another location, that is, touch and drag manipulation is sensed dragging to a location on the screen inactivation region, the controller 130 may extend the activation region to the location to which the bending line BL is moved, as illustrated for example in FIG. 31, discussed later.

The controller 130 determines a screen activation region and a screen inactivation region with reference to a bending line BL, and, if the bending line BL is continuously moved by bending manipulation rather than touch manipulation in a state in which a screen is displayed on the screen activation region defined by the bending line BL, the controller 130 may extend or contract the screen activation region to the location to which the bending line BL is moved. Determining whether the location of the bending line BL is moved may be performed according to whether coordinate values of the bending line BL outputting the maximum resistance values are continuously changed in a specific direction or not. An example of this situation is illustrated in FIG. 30, discussed later.

If the screen activation region is extended, the controller 130 may enlarge and display the existing information displayed on the original screen activation region, or may display additional information beside the existing information on the extended screen activation region, as illustrated for example in FIG. 30, discussed later.

Another Exemplary Embodiment

Although one bending line BL is provided in the above exemplary embodiment of the present general inventive concept, this is merely an example. Two or more bending lines BL may be provided. If two or more bending lines BL are sensed, at least one of the screen activation region and the screen inactivation region may include two or more divided regions. These divided regions are not necessarily adjacent to one another. For example, a first activation region may be defined by a corner of the flexible display 110 and a first bending line BL is formed by two points at which the first bending line BL meets first and second sides of the flexible display 110, which are adjacent to each other, and a vertex at which the first and second sides meet each other. A second activation region may be defined by another corner of the flexible display 110 and a second bending line BL. Specifically, the second activation region may be formed by two points at which a second bending line BL meets third and fourth sides of the flexible display 110, which are adjacent to each other, and a vertex at which the third and fourth sides meet each other. The remaining portion of the flexible display 110 may be a screen inactivation region. Alternatively, the first and second regions defined by the corners of the flexible display 110 may instead be an inactivation region, and the remainder of the flexible display 110 may be a screen activation region.

Also, in the above exemplary embodiment of the present general inventive concept, a region of the flexible display 110, which is in the inactivation state, is converted from the inactivation state to the activation state by bending. However, this is merely an example. According to another exemplary embodiment of the present general inventive concept, a region of the screen in the activation state may be converted from the activation state to the inactivation state by bending.

For example, if a certain region of the screen in the activation state is folded, contents displayed inside the folded region are moved to a region on which folding is not performed, and the folded region may be converted from the activation state into the inactivation state. In this case, contents originally displayed on the region on which folding is not performed are also moved to accommodate the contents from the folded region, such that some of the contents may disappear from the screen. Alternatively, all of the contents displayed on the region on which folding is not performed may disappear from the screen. An example of this situation is illustrated in FIG. 33, discussed later.

Alternatively, the contents displayed inside the folded region may not displayed on the screen, such that only the contents originally displayed on the region on which folding is not performed may be displayed.

Also, functions associated with the contents displayed on the region on which folding is not performed may be executed on the activation region regardless of the contents displayed on the folded region.

Various Functions Provided on a Screen Activation Region

Various functions may be provided on the screen activation region of the flexible display apparatus 100 according to a type of the flexible display apparatus 100.

For example, if the flexible display apparatus 100 is a mobile phone, the controller 130 may perform a function corresponding to the screen activation region from among functions such as phone connection, call block, menu display, text exchange, application selection or execution, and web browser execution and termination. As another example, if the flexible display apparatus 100 is a television, the controller 130 may perform a function corresponding to the screen activation region from among functions such as channel selection, volume adjustment, brightness adjustment, color adjustment, or contrast adjustment. The flexible display apparatus 100 may be embodied by various kinds of display apparatuses such as a personal digital assistant (PDA), an electronic album, an electronic book, an electronic scheduler, an MP3 player, a tablet PC, a laptop computer, or a monitor, and may perform various functions according to characteristics of each apparatus.

As described above, the flexible display 110 should be manufactured in a bendable form. The sensor 120 may sense a bending state in various ways.

Hereinafter, a detailed configuration of the flexible display 110 and a bending sensing method thereof will be explained.

A Configuration of a Flexible Display and a Method of Sensing Bending Thereof

Figure 2:
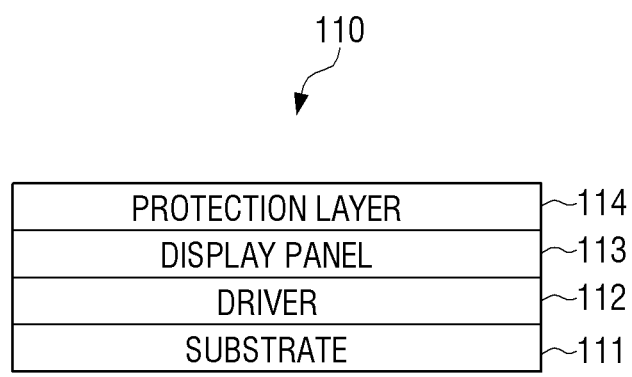
FIG. 2 is a view illustrating a basic configuration of a flexible display of a flexible display apparatus according to an exemplary embodiment of the present general inventive concept.

FIG. 2 is a view illustrating a basic structure of a flexible display 110 of a flexible display apparatus 100 according to an exemplary embodiment of the present general inventive concept. Referring to FIG. 2, the display 110 includes a substrate 111, a driver 112, a display panel 113, and a protection layer 114.

The flexible display apparatus 100 refers to an apparatus which can be bent, crooked, folded, or rolled like paper, while having display characteristics of a standard, non-flexible flat panel display apparatus. Accordingly, the flexible display apparatus 100 should be manufactured on a flexible substrate.

Specifically, the substrate 111 may be implemented by using a plastic (for example, a high molecular film) which is deformable by an external pressure.

The substrate 111 implemented with a plastic has a structure which is formed by performing barrier coating opposite surfaces of a base film. The base film may be implemented by using various resins such as polyimide (PI), polycarbonate (PC), polyethyleneterephtalate (PET), polyethersulfone (PES), polythylenenaphthalate (PEN), and fiber reinforced plastic (FRP). The barrier coating is performed on the opposite surfaces of the base film, and an organic membrane or an inorganic membrane may be used for the purpose of maintaining flexibility.

The substrate 111 may be formed of other flexible materials instead of plastic. Examples include thin glass or metal foil.

The driver 112 drives display panel 113. Specifically, the driver 112 applies a driving voltage to a plurality of pixels (not illustrated) which constitute the display panel 113, and may be implemented by using a-si TFT, a low temperature poly silicon (LTPS) TFT, or an organic TFT (OTFT). The driver 112 may also be implemented in various forms according to the form of the display panel 113. For instance, the display panel 113 may be made of an organic light emitting substance which includes a plurality of pixel cells, and an electrode layer which covers opposite surfaces of the organic light emitting substance. In this case, the driver 112 may include a plurality of transistors corresponding to the plurality of pixel cells of the display panel 113. The controller 130 applies an electric signal to a gate of each transistor and controls the pixel cells connected to the transistors to emit light. Accordingly, an image is displayed.

The display panel 113 may also be implemented by using, for example, an electroluminescent display (EL), an electrophoretic display (EPD), an electrochromic display (ECD), a liquid crystal display (LCD), an active matrix LCD (AMLCD), or a plasma display panel (PDP), besides an organic light emitting diode (OLED). However, if the display panel 113 is embodied by the LCD, it cannot emit light by itself and thus requires a separate backlight unit. If the LCD does not use backlight, it uses ambient light. In order to use a display panel 113 as the LCD without the backlight unit, an environment which admits plenty of light, such as an outdoor environment, may be used to illuminate the LCD and thereby enable its operation by a user.

The protection layer 114 protects the display panel 113. For example, the protection layer 114 may be made of ZrO, CeO$_2$, or ThO$_2$. The protection layer 114 may be manufactured as a transparent film and may cover the entire surface of the display panel 113.

In addition to the construction illustrated in FIG. 2, the flexible display 110 may be implemented by using electronic paper (e-paper). The e-paper is a display that applies general ink characteristics to paper, and is different from a general flat panel display in that it uses reflected light. The e-paper may change a picture or text using electrophoresis which uses a twist ball or a capsule.

If the flexible display 110 is made of elements which are made of a transparent material, the flexible display 110 may be implemented as a display apparatus that is bendable and transparent. For example, if the substrate 111 is made of a polymer material such as plastic having transparency, if the driver 112 is implemented by using a transparent transistor, and if the display panel 113 is implemented by using a transparent organic light emitting layer and a transparent electrode, the flexible display 110 may have transparency.

The transparent transistor refers to a transistor that is manufactured by substituting a transparent material such as zinc oxide or titanium oxide for the opaque silicon of a standard thin film transistor. The transparent electrode may be made of advanced materials such as indium tin oxide (ITO) or graphene. Graphene refers to a material that has a planar structure of a honeycomb shape in which carbon atoms are connected to one another, and has transparency. The transparent organic light emitting layer may be implemented by using various materials.

Figure 3:
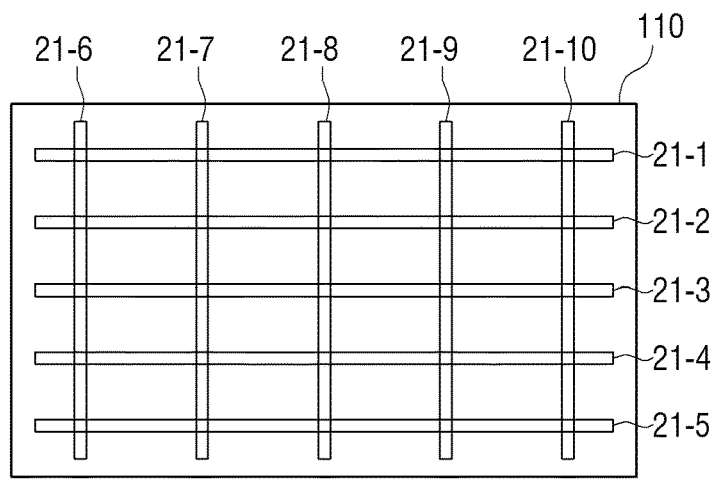
FIGS. 3 to 5 are views illustrating a method of sensing bending according to an exemplary embodiment of the present general inventive concept.

FIG. 3 is a view illustrating a method of sensing bending according to an exemplary embodiment of the present general inventive concept.

The flexible display apparatus 100 can be bent by an external pressure and its shape can be deformed. The term "bending" may include terms referring to deforming the shape, including normal bending, folding, and rolling. "Normal bending" means a state in which the flexible display apparatus 100 is bent along a line. "Folding" refers to a state in which the flexible display apparatus 100 is folded along a line. Folding and normal bending may be distinguished from each other by a degree of bending. For example, if bending is performed by more than a predetermined bending angle, the bending is defined as folding, and, if bending is performed by less than the predetermined bending angle, the bending is defined as normal bending.

"Rolling" refers to a state in which the flexible display apparatus 100 is rolled. The rolling is also determined based on a bending angle. For example, if bending by more than a predetermined bending angle is sensed over a predetermined area, the bending is defined as rolling. On the other hand, if bending by less than the predetermined bending angle is sensed in an area relatively smaller than that of rolling, the bending is defined as folding. Normal bending, folding and rolling described above may be determined based on a radius of curvature besides the bending angle.

Also, a state in which the rolled flexible display apparatus 100 has a substantially circular or oval cross section may be defined as rolling, regardless of a radius of curvature.

However, definitions of various shape deformation examples described above are merely an example and shape deformation may be defined differently according to the type, size, weight, and characteristic of the flexible display apparatus 100. For example, if the flexible display apparatus 100 can be bent to such an extent that the surfaces are in contact with each other, the state in which the surfaces of the flexible display apparatus 100 are in contact with each other by bending may be defined as folding. On the other hand, a state in which a front surface and a rear surface of the flexible display apparatus 100 are in contact with each other by bending may be defined as rolling.

Hereinafter, normal bending according to an exemplary embodiment of the present general inventive concept is referred to as bending for the convenience of explanation.

The flexible display apparatus 100 may sense bending in various ways.

For example, the sensor 120 may include a bend sensor 21 which is disposed on one surface such as a front surface or a rear surface of the flexible display 110, or a bend sensor 21 which is disposed on opposite surfaces of the flexible display 110. The controller 130 may sense bending using a value which is sensed by the bend sensor 21 of the sensor 130.

The bend sensor 21 refers to a sensor that can be bent and has a resistance value which varies according to a degree of bending. The bend sensor 21 may be implemented by using devices such as for example an optical fiber bending sensor, a pressure sensor, and a strain gauge.

The sensor 120 may sense a resistance value of the bend sensor 21 using a level of a voltage applied to the bend sensor 21 or an intensity of a current flowing in the bend sensor 21, and may sense bending in a location of the bend sensor 21 according to the sensed resistance value.

In the exemplary embodiment of the present general inventive concept illustrated in FIG. 3, the bend sensor 21 is embedded in the front surface of the flexible display 110. However, this is merely an example and the bend sensor 21 may be embedded in the rear surface of the flexible display 110 or may be embedded in opposite surfaces. Also, the shape, number, and location of bend sensors 21 may be changed variously. For example, the flexible display 110 may include a single bend sensor 21 or a plurality of bend sensors 21 which are connected to one another. The single bend sensor 21 may sense one bending data, but may include a plurality of sensing channels to sense a plurality of bending data.

FIG. 3 illustrates an example of a plurality of bar-shaped bend sensors 21 which are arranged in a vertical direction and a horizontal direction in a grid pattern.

Referring to FIG. 3, the sensor 120 includes bend sensors 21-1 to 21-5 which are arranged in a first direction, and bend sensors 21-6 to 21-10 which are arranged in a second direction which is perpendicular to the first direction. The bend sensors 21 are disposed away from one another by a predetermined distance.

In FIG. 3, five bend sensors (21-1 to 21-5, or 21-6 to 21-10) are arranged in each of the horizontal direction and the vertical direction in a grid formation. However, this is merely an example and the number of bend sensors 21 may be changed according to a size of the flexible display apparatus 100. The bend sensors 21 are arranged in the horizontal direction and the vertical direction for the sake of sensing bending from the entire area of the flexible display apparatus 100. Therefore, if only a part of the flexible display apparatus 100 is flexible or if the flexible display apparatus 100 needs to sense bending from only a part of the apparatus, the bend sensor 21 may be arranged in only a corresponding portion of the apparatus.

Each of the bend sensors 21-1 to 21-5, 21-6 to 21-10 may be implemented by using for example an electric resistance sensor which uses an electric resistance, or a micro optical fiber sensor which uses a strain of an optical fiber. Hereinafter, the bend sensor 21 will be explained on the assumption that the bend sensor 21 is an electric resistance sensor for the convenience of explanation.

Figure 4:
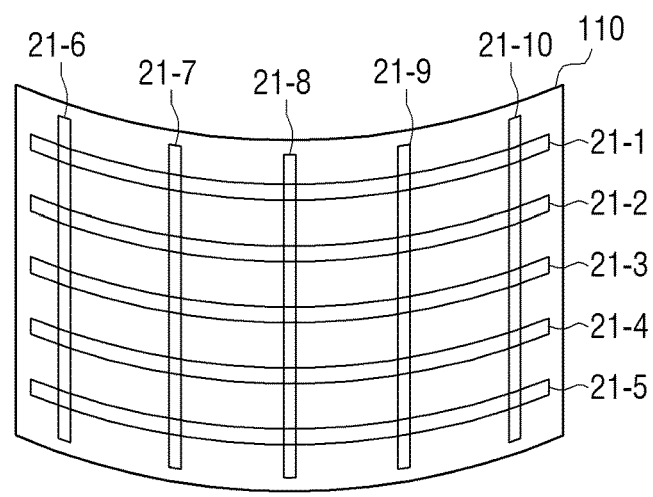

Specifically, if the flexible display apparatus 100 is bent so that its center area with reference to left and right edges is oriented downwardly as illustrated in FIG. 4, tension caused by bending is exerted to the bend sensors 21-1 to 21-5 which are arranged in the horizontal direction. Therefore, the resistance value of each of the bend sensors 21-1 to 21-5 arranged in the horizontal direction is changed. The sensor 120 senses the change in the output value output from each of the bend sensor 21-1 to 21-5 and thus determines that bending is performed in the horizontal direction with reference to the center of a display surface. In FIG. 4, the center area is bent in a downward direction (hereinafter, referred to as a Z− direction) which is perpendicular to the display surface. However, even if the center area is bent in an upward direction (hereinafter, referred to as a Z+ direction) with reference to the display surface, the bending may be sensed based on the change in the output values of the bend sensors 21-1 to 21-5 arranged in the horizontal direction.

Figure 5:
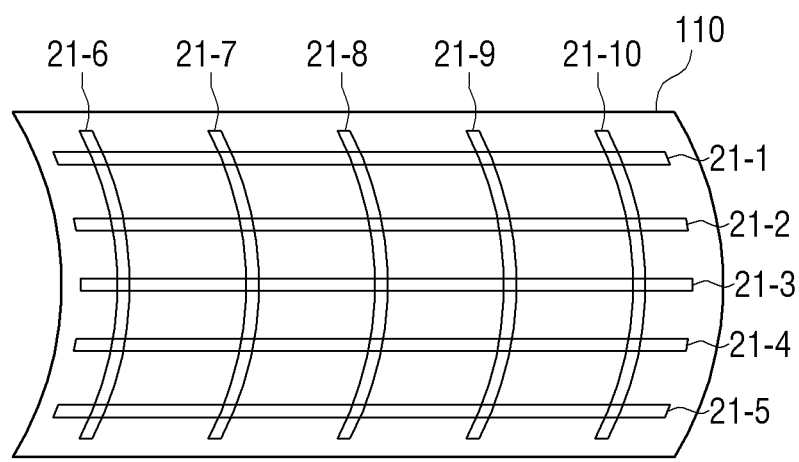

Also, if the flexible display apparatus 100 is bent so that the center area with reference to upper and lower edges is oriented upwardly as illustrated in FIG. 5, tension is exerted to the bend sensors 21-6 to 21-10 which are arranged in the vertical direction. The sensor 120 may sense shape deformation of the vertical direction based on the output values of the bend sensors 21-6 to 21-10 arranged in the vertical direction. Although the bending in the Z+ direction is illustrated in FIG. 5, bending in the Z− direction may also be sensed using the bend sensors 21-6 to 21-10 which are arranged in the vertical direction.

If shape deformation occurs in a diagonal direction, tension is exerted to all of the bend sensors 21 which are arranged in the horizontal direction and the vertical direction. Therefore, the shape deformation of the diagonal direction may be sensed based on the output values of the bend sensors 21 which are arranged in the horizontal and vertical directions.

Hereinafter, a method of sensing each shape deformation such as normal bending, folding, and rolling using a bend sensor 31 will be explained in detail with reference to FIGS. 6 and 7.

Figure 6:
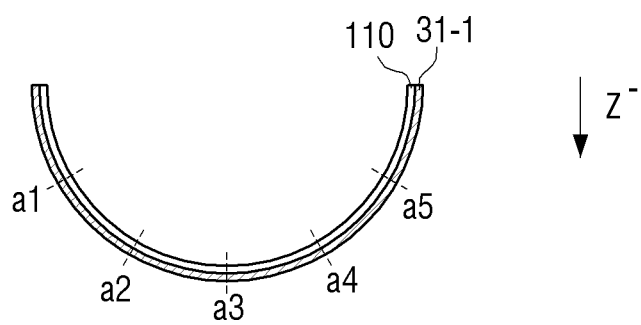
FIGS. 6 and 7 are views illustrating a method of sensing bending in a display apparatus using a bend sensor according to an exemplary embodiment of the present general inventive concept.
Figure 7:
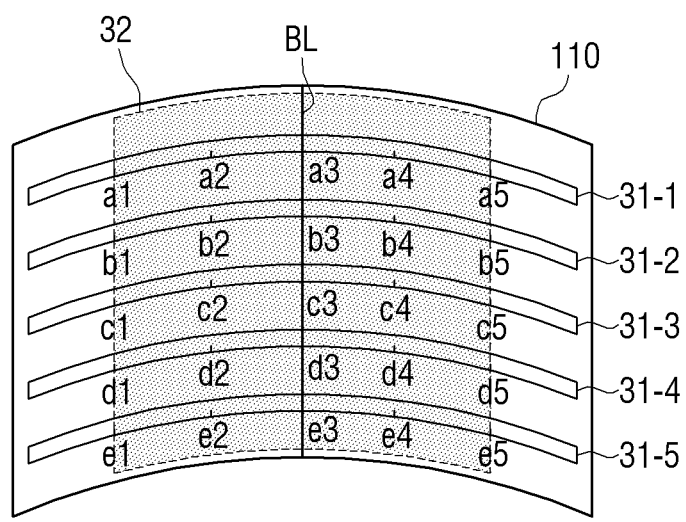

FIGS. 6 and 7 are views illustrating a method of sensing bending in the flexible display apparatus 100 using bend sensors 31 according to an exemplary embodiment of the present general inventive concept.

First, FIG. 6 is a cross section view of the flexible display apparatus 100 when the flexible display apparatus 100 is bent.

If the flexible display apparatus 100 is bent, the bend sensors 31, which are arranged on one surface or opposite surfaces of the flexible display apparatus 100, are also bent and have resistance values corresponding to a magnitude of exerted tension, and output values corresponding to the resistance values.

For instance, if the center of the flexible display apparatus 100 is bent in the Z-direction as illustrated in FIG. 6, a bend sensor 31-1 which is disposed on a rear surface of the flexible display apparatus 100 is also bent and outputs a resistance value according to a magnitude of exerted tension.

In this case, the magnitude of the tension increases in proportion to a degree of bending. If the bending occurs as illustrated in FIG. 6, the greatest bending occurs in the center area. Accordingly, the greatest tension is exerted to the bend sensor 31-1, which is disposed at a point a3 which is the center area, and accordingly, the bend sensor 31-1 has the greatest resistance value. On the other hand, the degree of bending gradually decreases toward the outside. Accordingly, the bend sensor 31-1 has smaller resistance values as it goes away from the point a3 to points a2 and a1 or points a4 and a5.

If the resistance value output from the bend sensor 31 has the greatest value at a specific point and gradually decreases in opposite directions, the sensor 120 may determine that the area from which the greatest resistance value is sensed is most significantly bent. Also, if an area has no change in the resistance value, the sensor 120 determines that the area is a flat area in which bending is not performed, and, if an area has the resistance value changed greater than a predetermined value, determines that the area is a bent area in which any degree of bending occurs.

FIG. 7 is a view illustrating a method of defining a bending area according to an exemplary embodiment of the present general inventive concept. FIG. 7 is a view illustrating the case in which the flexible display apparatus 100 is bent in the horizontal direction with reference to the front surface, and thus for the convenience of explanation does not illustrate the bend sensors 31 which are arranged in the vertical direction. Although different reference numerals are used for the bend sensors 31 in each drawing, the bend sensors 21 illustrated in FIG. 3 may be used as they are illustrated in FIG. 3.

A bending area is an area in which the flexible display apparatus 100 is bent. Since the bend sensor 31 is also bent by bending the flexible display apparatus 100, all points at which the bend sensors 31 output different resistance values from originals values may be defined as a bending area.

The sensor 120 may sense a size of a bending line BL, a direction of the bending line BL, a location of the bending line BL, a number of bending lines BL, a number of times that bending is performed, a bending speed of shape deformation, a size of a bending area, a location of the bending area, and a number of bending areas, based on a relationship between the points at which a change in the resistance value is sensed.

Specifically, if a distance between the points at which the change in the resistance value is sensed lies within a predetermined distance, the points are sensed as one bending area. On the other hand, if the distance between the points at which the change in the resistance value is sensed lies beyond the predetermined distance, different bending areas are defined with reference to these points. This will be explained in detail below with reference to FIG. 7.

FIG. 7 is a view illustrating a method of sensing one bending area. If the flexible display apparatus 100 is bent as illustrated in FIG. 7, the resistance values from points a1 to a5 of a bend sensor 31-1, from points b1 to b5 of a bend sensor 31-2, from c1 to c5 of a bend sensor 31-3, from points d1 to d5 of a bend sensor 31-4, and from points e1 to e5 of a bend sensor 31-5 are different from those in the original state.

In this case, the points at which the change in the resistance value is sensed in each bend sensor 31-1 to 31-5 are located within a predetermined distance and are continuously arranged.

Accordingly, the sensor 120 senses an area 32 which includes all of the points, from points a1 to a5 of the bend sensor 31-1, from points b1 to b5 of the bend sensor 31-2, from points c1 to c5 of the bend sensor 31-3, from points d1 to d5 of the bend sensor 31-4, and from points e1 to e5 of the bend sensor 31-5, as one bending area.

The bending area may include a bending line BL. The bending line BL refers to a line that connects different points at which the greatest value is output from the bend sensor 31. That is, a line that connects the points at which the greatest resistance value is sensed in each bending area is defined as a bending line BL.

For instance, in the case of FIG. 7, a bending line BL is defined in the bending area 32, connecting points a3, b3, c3, d3, and e3, which are points at which the greatest resistance value is output in the bend sensors 31-1, 31-2, 31-3, 31-4, and 31-5, respectively. FIG. 7 illustrates the bending line BL which is formed in the center area of the flexible display 110 in the vertical direction, which may be Z− or Z+.

Figure 8:
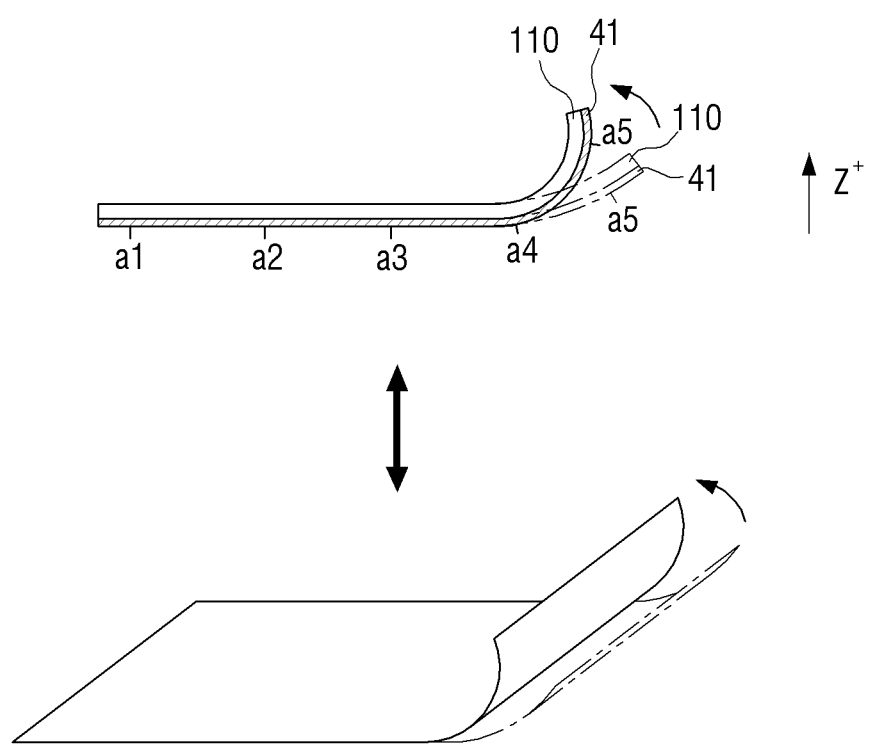
FIG. 8 is a view illustrating a method of determining a degree of bending according to an exemplary embodiment of the present general inventive concept.

FIG. 8 is a view illustrating a method of determining a degree of bending according to an exemplary embodiment of the present general inventive concept.

Referring to FIG. 8, the flexible display apparatus 100 determines a degree of bending of the flexible display apparatus 100 using a change in the resistance value output from a bend sensor 41 at a predetermined interval, that is, a bending angle.

Specifically, the controller 130 calculates a difference between a resistance value of a point where the greatest resistance value of a bend sensor is output and a resistance value output at a point which is disposed away from the point of the greatest resistance value by a predetermined distance.

The controller 130 determines a degree of bending using the calculated difference in the resistance value. Specifically, the flexible display apparatus 100 divides the degree of bending into a plurality of levels, matches each level with a resistance value of a predetermined range, and stores the matched values.

Accordingly, the flexible display apparatus 100 determines the degree of bending according to which level of the plurality of levels corresponds to the calculated resistance value difference.

For instance, as illustrated in FIG. 8, the degree of bending in a Z+ direction is determined based on a difference between a resistance value output at a point a5 where a bend sensor 41 disposed on the rear surface of the flexible display apparatus 100 outputs the greatest resistance value, and a resistance value output at a point a4 which is disposed away from the point a5 by a predetermined distance.

Specifically, a level corresponding to the resistance value difference, which is calculated in the exemplary embodiment of FIG. 8, is identified from among the plurality of pre-stored levels, and a degree of bending is determined based on the identified level. The degree of bending may be represented by a bending angle or an intensity of bending.

If the degree of bending increases between points a4 and a5 as illustrated in FIG. 8, the difference between the resistance value output at the point a5 and the resistance value output at the point a4 increases in comparison to an existing resistance value difference. Accordingly, the controller 130 may determine that the degree of bending increases.

The flexible display apparatus 100 according to the present exemplary embodiment may be bent in different directions, including a Z+ direction and a Z− direction.

FIG. 9 is a view illustrating a method of determining a degree of bending according to an exemplary embodiment of the present general inventive concept, using a bend sensor 51.

As illustrated in FIG. 9, a degree of bending may be determined based on a change in a bending radius R. Since the bending radius R is determined based on a change in a resistance value of each bend sensor 51 as in the exemplary embodiment illustrated in FIG. 8, a detailed description is omitted. As the flexible display 110 is bent from a first position (illustrated with solid lines) to a second position (illustrated with dotted lines), the resistance value of each bend sensor 51 changes, indicating the bending radius R likewise is changing.

As described above, a layout of a screen activation region may vary according to a bending radius R.

The bending direction may be sensed in various ways. For instance, two bend sensors 51 may be disposed one on the other and the bending direction is determined based on a difference in change in the resistance value of each bend sensor 51. A method of sensing a bending direction using overlapping bend sensors 61 will be explained with reference to FIGS. 10 to 11.

Referring to FIG. 10, two bend sensors 61-1 and 61-2 may be disposed overlapping each other on one side of the flexible display 110. In this case, if bending is performed in one direction, different resistance values are output from the upper bend sensor 61-1 and the lower bend sensor 61-2 at a point where the bending is performed. Accordingly, a bending direction may be determined by comparing the resistance values of the two bend sensors 61-1 and 61-2 at the same point.

Figure 11:
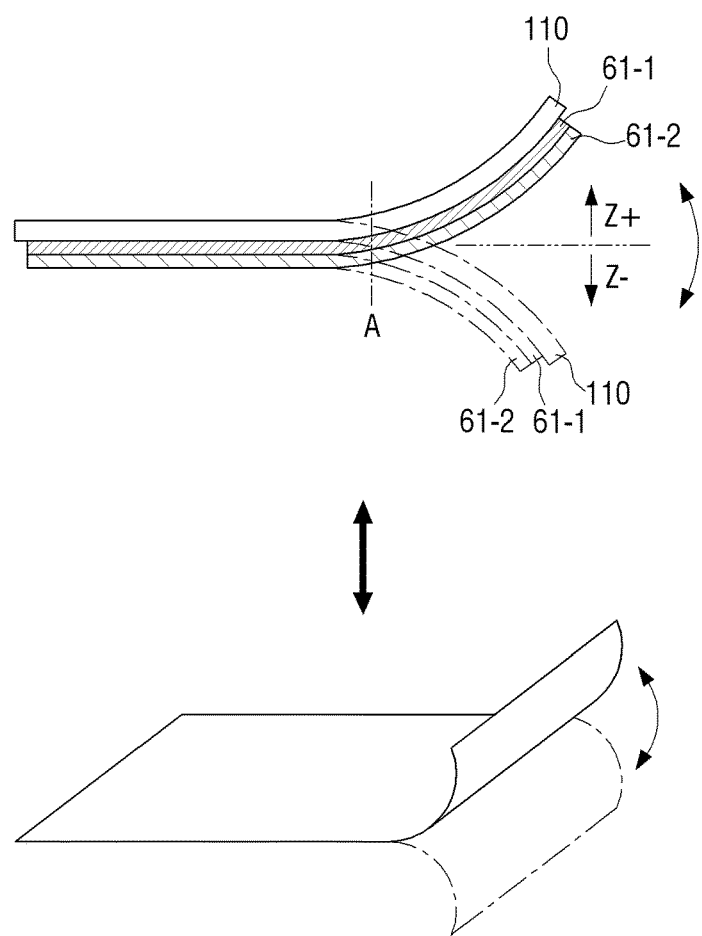

Specifically, if the flexible display apparatus 100 is bent in the Z+ direction as illustrated in FIG. 11, tension exerted to the lower bend sensor 61-2 is greater than that of the upper bend sensor 61-1 at a point 'A' corresponding to a bending line BL.

On the other hand, if the flexible display apparatus 100 is bent in the Z− direction, tension exerted to the upper bend sensor 61-1 is greater than that of the lower bend sensor 61-2.

Accordingly, the controller 130 senses the bending direction by comparing the resistance values of the two bend sensors 61-1 and 61-2 at the point A.

Although the two bend sensors 61-1 and 61-2 are disposed overlapping each other on one side of the flexible display 110 in FIGS. 10 and 11, the bend sensors 61-1 and 61-2 may be disposed on opposite surfaces of the flexible display 110.

Figure 12:
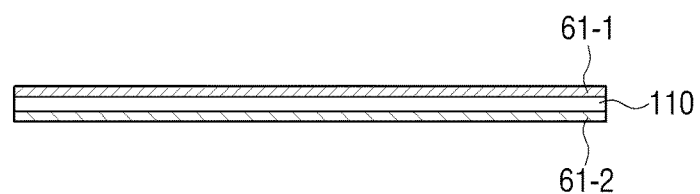
FIG. 12 is a view illustrating two bend sensors which are disposed on opposite surfaces of the flexible display.

FIG. 12 illustrates the two bend sensors 61-1 and 61-2 which are disposed on the opposite surfaces of the flexible display 110.

Accordingly, if the flexible display apparatus 100 is bent in a first direction perpendicular to the screen, that is, the Z+ direction, the bend sensor 61-1 which is disposed on a first surface of the opposite surfaces of the flexible display 110 is subject to a compressive force, whereas the bend sensor 61-2 which is disposed on a second surface is subject to tension. On the other hand, if the flexible display apparatus 100 is bent in a second direction opposite to the first direction, that is, the Z-direction, the bend sensor 61-2 disposed on the second surface is subject to a compressive force, whereas the bend sensor 61-1 disposed on the first surface is subject to tension. As described above, the different values are detected from the two bend sensors 61 according to the bending direction and the controller 130 determines the bending direction according to a detection characteristic of the value.

Although the bending direction is sensed using the two bend sensors 61-1 and 61-2 in FIGS. 10 to 12, the bending direction may be sensed by means of only a strain gage 80 (illustrated in FIG. 14) disposed on one surface of the flexible display 110. That is, a compressive force or tension is exerted to the strain gage 80 disposed on one surface according to a bending direction, and thus a bending direction can be determined by identifying a characteristic of the output value. An exemplary embodiment of the present general inventive concept using strain gages 80 is described later with reference to FIG. 14.

Figure 13A:
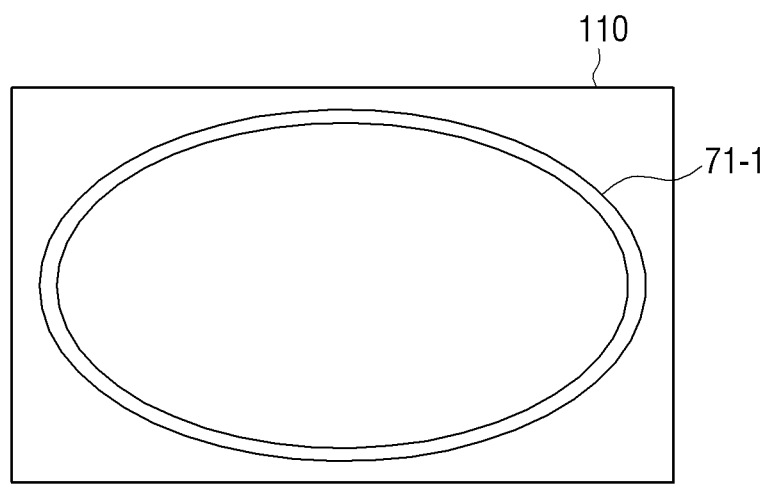
FIGS. 13A and B are views illustrating an exemplary embodiment of the present general inventive concept in which one or two bend sensors are disposed.

FIG. 13A illustrates an example of a single bend sensor 71 which is disposed on one surface of the flexible display 110 to sense bending. Referring to FIG. 13A, the bend sensor 71 may be implemented in a form of a looped curve forming a circle, a quadrangle, or other polygons, and may be disposed along an edge of the flexible display 110. The controller 130 may determine a point at which a change in an output value of the looped curve is sensed to be a bending area. The bend sensor 71 may be connected to the flexible display 110 in a form of an open curve such as an S shape, a Z shape, or a zigzag shape.

Figure 13B:
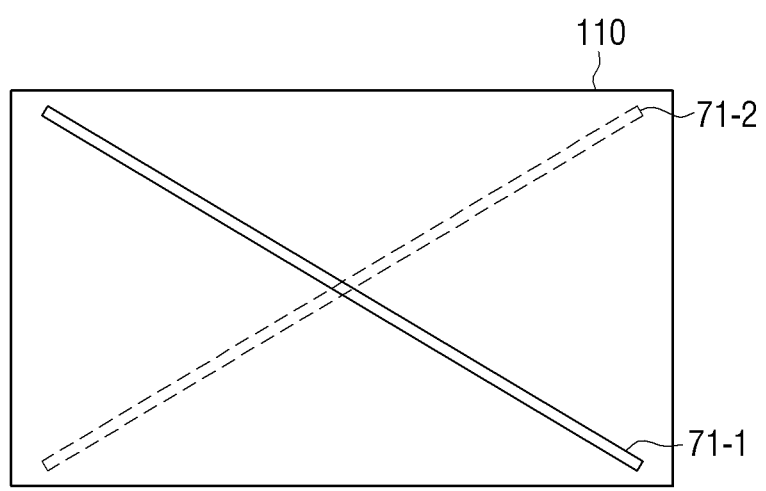

FIG. 13B illustrates two bend sensors 71-1 and 71-2 which intersect. Referring to FIG. 13B, a first bend sensor 71-1 is disposed on a first surface of the flexible display 110 and a second bend sensor 71-2 is disposed on a second surface of the flexible display 110. The first bend sensor 71-1 is disposed on the first surface of the display 110 in a first diagonal direction, and the second bend sensor 71-2 is disposed on the second surface in a second diagonal direction. Accordingly, output values and output points of the first and second bend sensors 71-1 and 71-2 are changed according to various bending conditions such as a case in which each corner of the flexible display apparatus 100 is bent, a case in which each edge is bent, a case in which a center is bent, and a case in which folding or rolling of the flexible display apparatus 100 is performed. Accordingly, the controller 130 may determine which type of bending is performed according to a characteristic of the output value.

Although line type bend sensors 21, 31, 41, 51, 61, and 71 are used in the above-described exemplary embodiments of the present general inventive concept, bending may be sensed using a plurality of separate strain gages 80.

Figure 14:
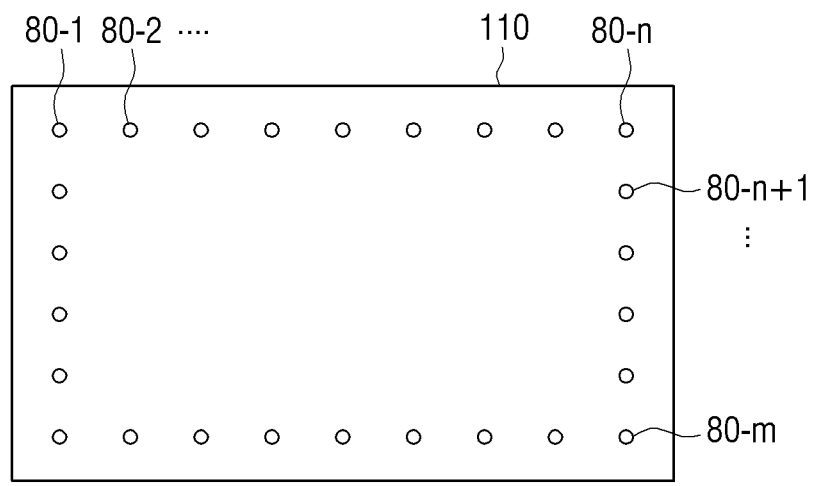
FIG. 14 is a view illustrating an exemplary embodiment of the present general inventive concept in which bending is sensed using a plurality of strain gages.

FIG. 14 is a view illustrating a method of sensing bending using a plurality of strain gages 80 according to an exemplary embodiment of the present general inventive concept. Each strain gage 80 uses metal or a semiconductor in which a resistance is greatly changed according to an applied force, and senses deformation of a surface of an object to be measured according to a change in the resistance value. A material such as metal increases a resistance value if its length is stretched by an external force, and decreases the resistance value if the length is contracted. Accordingly, it is determined whether bending is performed or not by sensing a change in the resistance value.

Referring to FIG. 14, a plurality of strain gages 80 are arranged along an edge of the flexible display 110. The number of strain gages 80 may be changed according to a size and a shape of the display 110, or a predetermined bending sensing resolution.

In the state in which the strain gages 80 are arranged as illustrated in FIG. 14, a user may bend a certain point in a certain direction. Specifically, if a certain corner of the flexible display apparatus 100 is bent, a force is exerted on a strain gage 80 overlapped with a bending line BL from among strain gages 80-1 to 80-$n$ which are arranged in a horizontal direction. Accordingly, an output value of the corresponding strain gage 80 increases in comparison with output values of the other strain gages 80. Also, a force is exerted to a strain gage 80 overlapped with the bending line BL from among strain gages 80-$n$, 80-$n$+1 to 80-$m$ which are arranged in a vertical direction, and thus an output value is changed. The controller 130 determines a line connecting the two strain gages 80 in which the output values are changed as a bending line BL.

Also, in addition to the exemplary embodiments illustrated in FIGS. 11 to 14, the flexible display apparatus 100 may sense a bending direction using various sensors such as a gyro sensor, a geomagnetic sensor, and an acceleration sensor.

Figure 15:
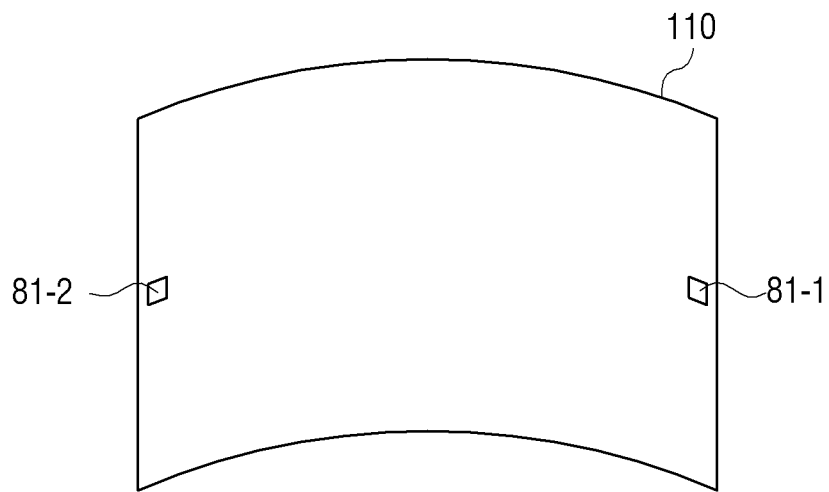
FIG. 15 is a view illustrating a method of sensing a bending direction using an acceleration sensor which is an example of sensors.

FIG. 15 is a view illustrating a method of sensing a bending direction using an acceleration sensor 81 for example. Referring to FIG. 15, the flexible display apparatus 100 includes a plurality of acceleration sensors 81-1 and 81-2.

The acceleration sensors 81-1 and 81-2 can measure acceleration of a motion and a direction of the acceleration. Specifically, the acceleration sensors 81-1 and 81-2 output a sensing value corresponding to acceleration of gravity which changes according to a slope of an apparatus where those sensors are attached. Accordingly, if the acceleration sensors 81-1 and 81-2 are disposed on opposite edges of the flexible display apparatus 100, output values sensed by the acceleration sensors 81-1 and 81-2 are changed when the flexible display apparatus 100 is bent. The controller 130 calculates a pitch angle and a roll angle using the output values sensed by the acceleration sensors 81-1 and 81-2. Accordingly, the controller 130 may determine a bending direction based on changes in the pitch angle and the roll angle sensed by the acceleration sensors 81-1 and 81-2.

In FIG. 15, the acceleration sensors 81-1 and 81-2 are disposed on opposite edges in the horizontal direction with reference to the front surface of the flexible display apparatus 100. However, the acceleration sensors 81-1 and 81-2 may be disposed in the vertical direction. In this case, if the flexible display apparatus 100 is bent in the vertical direction, a bending direction is sensed according to measurement values sensed by the acceleration sensors 81-3 and 81-4 in the vertical direction.

According to another exemplary embodiment of the present general inventive concept, the acceleration sensors 81 may be disposed at all of the left, right, upper and right edges, or may be disposed on corners.

As described above, a bending direction may be sensed using a gyro sensor or a geomagnetic sensor besides the acceleration sensor. A gyro sensor refers to a sensor which, if a rotational motion occurs, detects an angular velocity by measuring Coriolis' force exerted in a velocity direction of the motion. Based on a measurement value of the gyro sensor, a direction of the rotational motion can be sensed and thus a bending direction can also be sensed. The geomagnetic sensor refers to a sensor which senses azimuth using a 2-axis or 3-axis fluxgate. If such a geomagnetic sensor is applied, the geomagnetic sensor disposed on each edge of the flexible display apparatus 100 suffers from location movement when the edge is bent, and outputs an electric signal corresponding to a change in geomagnetism caused by the location movement. The controller 130 may calculate a yaw angle using the value output from the geomagnetic sensor. According to a change in the calculated yaw angle, various bending characteristics such as a bending area and a bending direction can be determined.

As described above, the flexible display apparatus 100 may sense bending using various kinds of sensors. The above-described methods of arranging the sensors and methods of sensing may be applied to the flexible display apparatus 100 individually or may be applied in combination.

The sensor 120 may sense user's touch manipulation on the flexible display 110 besides the bending.

Specifically, the sensor 120 may sense a touch manipulation using capacitive overlay, resistive overlay, infrared beam, surface acoustic wave, integral strain gauge, and piezo electric.

The touch sensing method using capacitive overlay refers to a method that senses a location by sensing a change in capacitance when a user touches a screen with his/her finger.

A pressing operation may cause upper and lower surfaces of the flexible display 110 to contact each other and thus may cause a change in resistance values. At this time, a voltage may be changed due to a current flowing in opposite ends of the flexible display 110. The touch sensing method using resistive overlay refers to a method that senses a touch location using such a change in the voltage.

The touch sensing method using infrared beam refers to a method that senses a location using the principle that, when a user touches a screen of an Optp-matrix frame-mounted monitor with an article capable of blocking light such as a finger, light emitted from an infrared ray emitting diode is blocked and thus is not detected by an opposite photo transistor.

The touch sensing method using surface acoustic wave refers to a method that is implemented in a simple principle using a characteristic that ultrasonic waves are propagated along a surface, and a propagation characteristic of sound that sound travels by a regular distance within a predetermined time, and senses a time interval of sound which is reflected and received through a transmitter and a reflector.

If a user presses one corner of the flexible display 110 with his/her hand, a tension measuring apparatus disposed at the pressed corner is subject to the greatest force from among the tension measuring apparatuses provided at the four corners of the flexible display 110, and the pressure is changed to an electric signal according the degree of increased force, and the electric signal is transmitted to a controller. The touch sensing method using an integral strain gauge refers to a method that calculates coordinate values by calculating a ratio of electric signals of the four corners of the flexible display 110.

When a user touches the flexible display 110, four corners of the flexible display 110 are subject to different degrees of pressure according to a degree of pressure at the touch point and a touch location. The touch sensing method using piezo electric refers to a method that senses a touch location by calculating a ratio of electric signals of the four corners of the flexible display 110.

For instance, the sensor 120 may include a transparent conductive oxide film such as an indium-tin oxide (ITO) deposited on the substrate 111 of the flexible display 110, and a film formed on an upper portion of the transparent conductive oxide film. Accordingly, if the user touches the screen, upper and lower plates at the touched point are brought into contact with each other and an electric signal is transmitted to the controller 130. The controller 130 recognizes the touched point using coordinates of an electrode to which the electric signal is transmitted.

If bending is sensed in a screen inactivation state, the controller 130 may activate a bending region which is divided by a bending line BL, and, if bending is sensed in a screen activation state, the controller 130 may inactivate a bending region which is divided by a bending line BL. The detailed functions of the controller 130 have been described above and thus a detailed description thereof is omitted.

Figure 16:
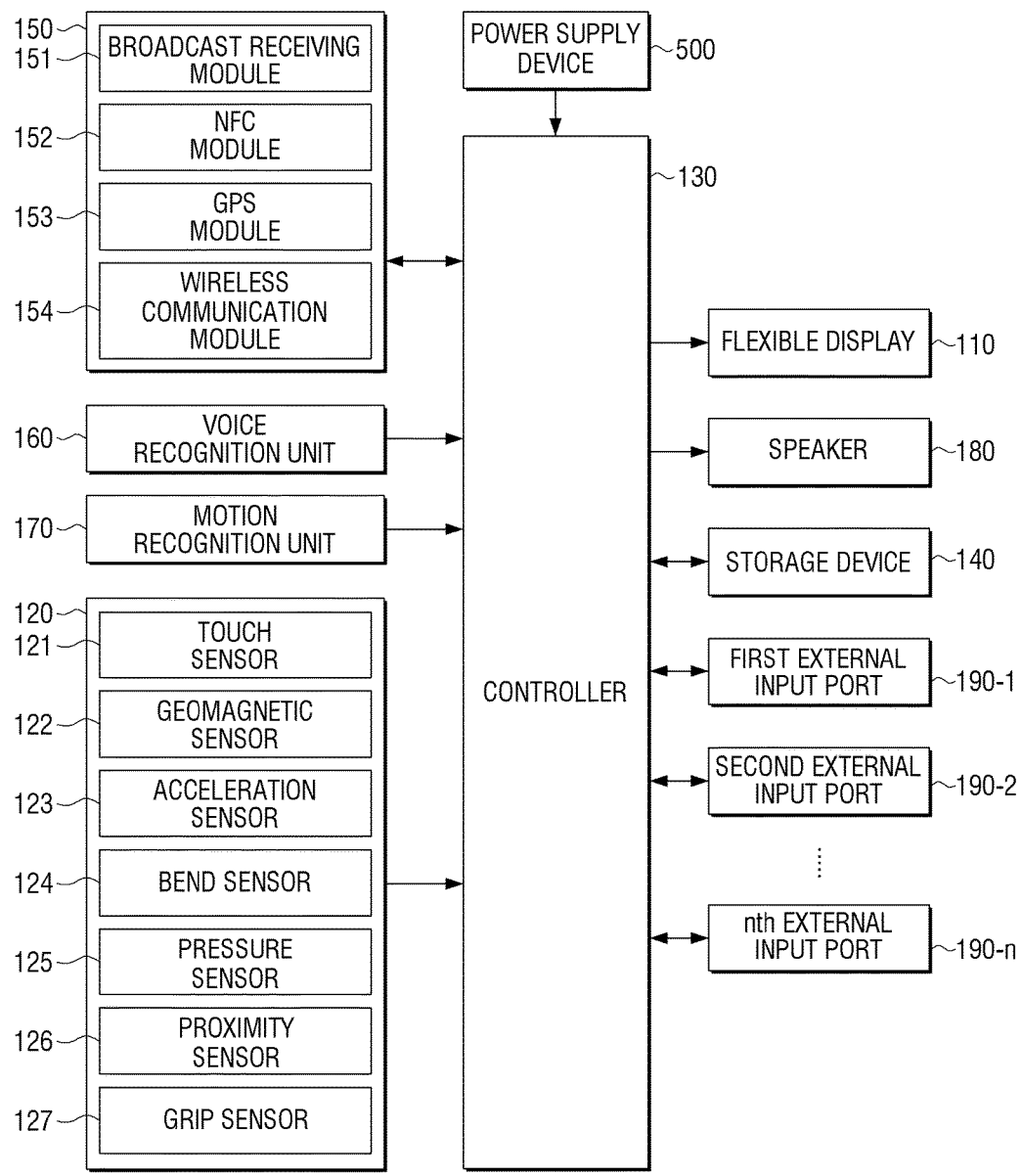
FIG. 16 is a block diagram illustrating an example of a detailed configuration of a flexible display apparatus to explain operations according to an exemplary embodiment of the present general inventive concept.

Examples of a Detailed Configuration of a Flexible Display Apparatus According to Exemplary Embodiments of the Present General Inventive Concept FIG. 16 is a block diagram illustrating a detailed configuration of a flexible display apparatus 100 to explain operations according to an exemplary embodiment of the present general inventive concept.

Referring to FIG. 16, a display apparatus 100 includes a flexible display 110, a sensor 120, a controller 130, a storage device 140, a communication unit 150, a voice recognition unit 160, a motion recognition unit 170, a speaker 180, external input ports 190-1~190-n, and a power supply 500.

The flexible display 110 has flexibility. The detailed configuration and operation of the flexible display 110 has been described above and thus a redundant explanation is omitted.

The storage device 140 may store various programs or data associated with the operation of the flexible display 110, setting information set by the user, system driving operating software, and various applications.

Also, the storage device 140 may store information on the above-described plurality of functions and information on priority given to the plurality of functions.

Also, the storage device 140 may store information on at least one function matching each region of the flexible display 110. Also, the storage device 140 may store information on priority given to each function.

Figure 17:
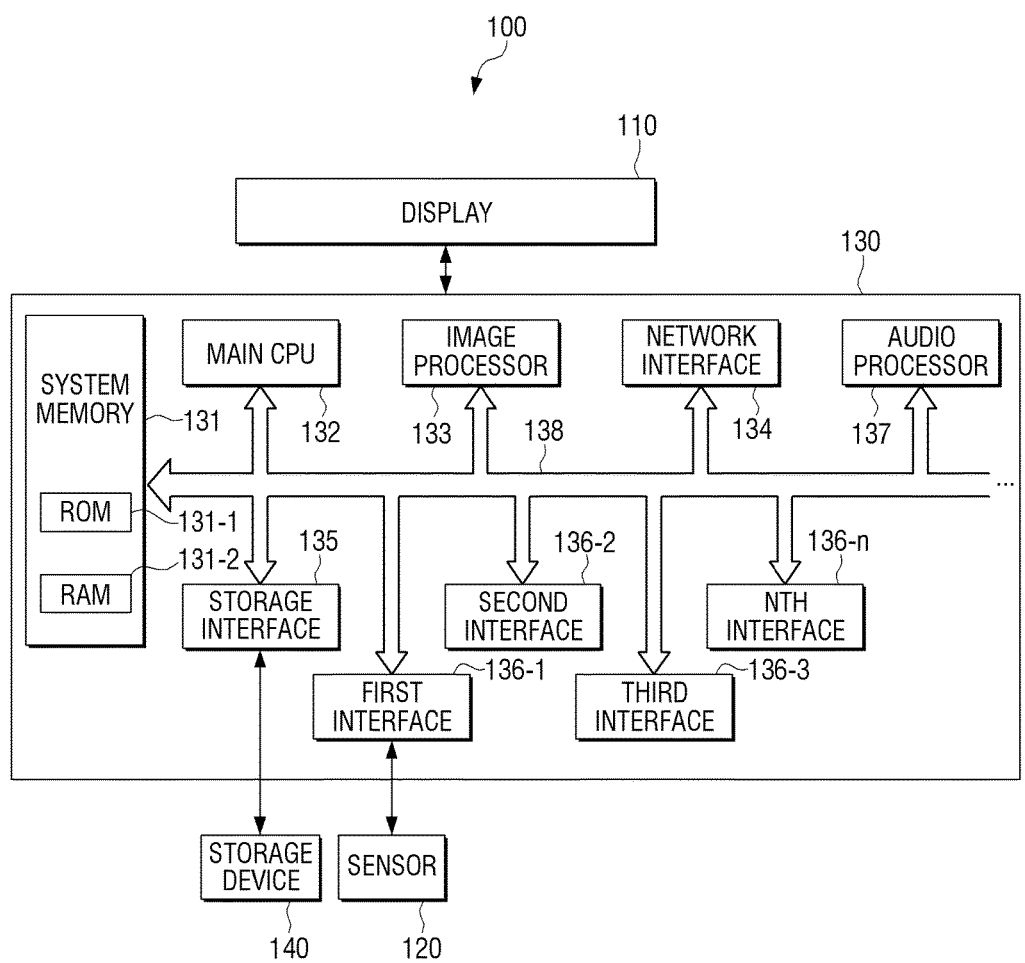
FIG. 17 is a view illustrating a detailed configuration of the controller of FIG. 16.

The sensor 120 senses user manipulation performed on the flexible display apparatus 100 including the flexible display 110, in particular, bending manipulation or touch manipulation. Referring to FIG. 17, the sensor 120 may include various kinds of sensors such as a touch sensor 121, a geomagnetic sensor 122, an acceleration sensor 123, a bend sensor 124, a pressure sensor 125, a proximity sensor 126, and a grip sensor 127.

The touch sensor 121 may be implemented by using a capacitive type or a resistive type of sensor. The capacitive type calculates touch coordinates by sensing minute electricity excited in a user's body when a part of the user's body touches the surface of the flexible display 110, using a dielectric substance coated on the surface of the flexible display 110. The resistive type includes two electrode plates embedded in a remote control apparatus (not illustrated), and, if a user touches a screen, calculates touch coordinates by sensing an electric current flowing due to contact between upper and lower plates at the touched point. Besides these, infrared beam, surface acoustic wave, integral strain gauge, or piezo electric sensors may be used to sense touch manipulation.

The touch sensor 121 may be implemented in various forms as described above.

The geomagnetic sensor 122 is to sense a rotation state and a moving direction of the flexible display apparatus 100. The acceleration sensor 123 is to sense a degree of tilt of the flexible display apparatus 100. The geomagnetic sensor 122 and the acceleration sensor 123 may be used to sense bending characteristics such as a bending direction or a bending area of the flexible display apparatus 100 as described above. However, the geomagnetic sensor 122 and the acceleration sensor 123 may be used to sense a rotation state or a tilt state of the flexible display apparatus 100.

The bend sensor 124 may be embodied in various shapes and numbers as described above, and may sense a bent state of the flexible display apparatus 100. The configuration and operation of the bend sensor 124 has been described above and thus a redundant explanation is omitted.

The pressure sensor 125 senses a magnitude of pressure exerted to the flexible display apparatus 100 when the user performs touch or bending manipulation, and provides the magnitude of pressure to the controller 130. The pressure sensor 125 may include a piezo film which is embedded in the flexible display 110 and outputs an electric signal corresponding to the magnitude of pressure. Although the pressure sensor 125 is a separate element from the touch sensor 121 in FIG. 17, if the touch sensor 121 is implemented by using a resistive touch sensor, the resistive touch sensor may also perform the function of the pressure sensor 125.

The proximity sensor 126 is to sense a motion which approaches without directly contacting the display surface. The proximity sensor 126 may be implemented by using various types of sensors such as a high-frequency oscillation type proximity sensor which forms a high frequency magnetic field and detects an electric current induced by a magnetic characteristic which is changed when an object approaches, a magnetic type proximity sensor which uses a magnet, and a capacitive type proximity sensor which detects capacitance which changes when an object approaches.

The grip sensor 127 is disposed on a border or a handle of the flexible display apparatus 100 separately from the pressure sensor 125, and senses a user's grip. The grip sensor 127 may be implemented by using a pressure sensor or a touch sensor.

The controller 130 analyzes various sensing signals sensed by the sensor 120, and, if it is determined that bending manipulation is performed, determines a screen activation region and a screen inactivation region with reference to a bending line BL, and displays a corresponding screen on the screen inactivation region.

For example, the controller 130 processes data which is obtained by communicating with an external apparatus, or data which is stored in the storage device 140, and outputs the data through the screen activation region of the flexible display 110 and the speaker 180. In this case, the controller 130 may communicate with the external apparatus using the communication unit 150.

The communication unit 150 may communicate with various types of external apparatuses according to various communication methods. The communication unit 150 may include various communication modules such as a broadcast receiving module 151, a near field communication (NFC) module 152, a GPS module 153, and a wireless communication module 154. The broadcast receiving module 151 may include a terrestrial broadcast receiving module (not illustrated) including an antenna to receive a terrestrial broadcast signal, a demodulator, and an equalizer, and a digital multimedia broadcasting (DMB) module to receive and process a DMB broadcast signal. The NFC module 152 is a module that communicates with an external apparatus located at a near distance according to an NFC method such as NFC, Bluetooth, or Zigbee. The GPS module 153 is a module that receives a GPS signal from a GPS satellite and detects a current location of the display apparatus 100. The wireless communication module 154 is a module that is connected to an external network according to a wireless communication protocol such as Wi-Fi or IEEE and communicates with the external network. The NFC module 152 may further include a mobile communication module that accesses a mobile communication network and performs communication according to various mobile communication standards such as $3^{rd}$ generation (3G), $3^{rd}$ generation partnership project (3GPP), and long term evolution (LTE).

The controller 130 may control the communication unit 150 to receive a content from an external apparatus or transmit a content to an external apparatus according to a function performed on the screen activation region.

The controller 130 may recognize voice input or motion input besides the bending manipulation or touch manipulation, and may perform an operation corresponding to the input. In this case, the controller 130 may activate the voice recognition unit 160 or the motion recognition unit 170.

The voice recognition unit 160 collects a user's voice or an external sound using a voice obtaining means such as a microphone (not illustrated), and transmits the user's voice or the external sound to the controller 130. If the user's voice is consistent with a pre-set voice command in a voice control mode, the controller 130 may perform a task corresponding to the user's voice.

The motion recognition unit 170 obtains a user's image using an image pickup device (not illustrated) such as a camera, and provides the user's image to the controller 130. If the controller 130 analyzes the user's image and determines that the user makes a motion gesture corresponding to a pre-set motion command in a motion control mode, the controller 130 performs an operation corresponding to the motion gesture.

For example, various tasks such as changing a channel, turning an apparatus or off, pausing, reproducing, stopping, rewinding, fast forwarding, and mute may be controlled according to a voice or a motion gesture. However, this should not be considered as limiting.

The external input ports 190-1 through 190-n may be connected to various types of external apparatuses and may receive various data or programs or control commands. Specifically, the external input ports may include USB ports, headset ports, mouse ports, and LAN ports. The power supply 500 supplies power to the elements of the flexible display apparatus 100. The power supply 500 may be implemented by including an anode collector, an anode electrode, an electrolyte, a cathode electrode, a cathode collector, and a sheath enclosing the aforementioned members. The power supply 500 may be implemented by using a secondary cell which is chargeable and dischargeable. The power supply 500 may be implemented in a flexible form so that it can be bent along with the flexible display apparatus 100. In this case, the collector, the electrode, the electrolyte, and the sheath may be made of a flexible material. Detailed configuration and material of the power supply 500 will be explained separately below.

Although FIG. 16 illustrates various elements which may be included in the flexible display apparatus 100, the flexible display apparatus 100 may not necessarily include all of the elements and may not include only the above elements. Therefore, some of the elements may be omitted or added according to a product type of the flexible display apparatus 100, or may be replaced with other elements.

The controller 130 may control the elements according to user manipulation which is recognized through the sensor 120, the voice recognition unit 160, and the motion recognition unit 170 described above, and may perform various operations.

FIG. 17 is a view illustrating the controller 130 of FIG. 16 in detail.

Referring to FIG. 17, the controller 130 may include a system memory 131, a main CPU 132, an image processor 133, a network interface 134, a storage interface 135, first to nth interfaces 136-1 to 136-*n*, an audio processor 137, and a system bus 138.

The system memory 131, the main CPU 132, the image processor 133, the network interface 134, the storage interface 135, the first to nth interfaces 136-1 to 136-*n*, and the audio processor 137 may be connected to one another through the system bus 138, and may exchange various data or signals with one another.

The first to nth interfaces 136-1 to 136-*n* support interfacing between the elements including the sensor 120 and the elements of the controller 130. In FIG. 17, the sensor 120 is connected to only the first interface 136-1. However, if the sensor 120 includes various types of sensors as illustrated in FIG. 16, each of the sensors may be connected through one of the interfaces. For example, the touch sensor 121 may be connected through the first interface 136-1 while the geomagnetic sensor 122 may be connected through the second interface 136-2, and so on. Also, at least one of the first to nth interfaces 136-1 to 136-*n* may be implemented by using a button (not illustrated) which is provided on a body of the flexible display apparatus 100, or an input interface (not illustrated) which receives various signals from an external apparatus which is connected through external input ports 1 to n.

The system memory 131 includes a read only memory (ROM) 131-1 and a random access memory (RAM) 131-2. The ROM 131-1 stores a set of commands for system booting. If a turn on command is input and power is supplied to the flexible display apparatus 100, the main CPU 132 copies an OS which is stored in the storage device 140 into the RAM 131-2 according to a command stored in the ROM 131-1, executes the OS, and boots the system. If booting is completed, the main CPU 132 copies various applications stored in the storage device 140 into the RAM 131-2, executes the applications copied into the RAM 131-2, and performs various operations.

As described above, the main CPU 132 may perform various operations according to the application stored in the storage device 140.

The storage interface 135 is connected to the storage device 140 and exchanges various programs, content, and data with the storage device 140.

For example, if a screen activation region is determined according to bending manipulation of the user, the main CPU 132 may access the storage device 140 through the storage interface 135, identify information stored in the storage device 140, and execute a function corresponding to the screen activation region, for example, a moving image reproducing function. In this state, if the user selects one content, the main CPU 132 executes a moving image reproducing program stored in the storage device 140. The main CPU 132 controls the image processor 133 to form a moving image reproducing screen according to a command included in the moving image reproducing program.

The image processor 133 may include a decoder, a renderer, and a scaler (not illustrated). Accordingly, the image processor 133 decodes a stored content, renders the decoded content data and forms a frame, and scales a size of the frame according to a screen size of the flexible display 110. The image processor 133 provides the processed frame to the flexible display 110 and displays the same.

The audio processor 137 refers to an element that processes audio data and provides the audio data to a sound outputting means such as a speaker 180. The audio processor 137 performs audio signal processing by decoding audio data which is stored in the storage device 140 or audio data which is received through the communication unit 150, filtering noise, and amplifying the audio data to an appropriate decibel level. In the above example, if the content to be reproduced is a moving image content, the audio processor 137 may process the audio data which is de-multiplexed from the moving image content, and may provide the audio data to the speaker 180 so that the audio data is synchronized with the image processor 133 and is output.

The network interface 134 is connected to external apparatuses through a network. For example, if a web browser program is executed, the main CPU 132 accesses a web server through the network interface 134. If web page data is received from the web server, the main CPU 132 controls the image processor 133 to form a web page screen, and displays the web page screen on the flexible display 110.

As described above, if bending manipulation is sensed in the flexible display apparatus 100, the controller 130 detects a bending line BL according to the sensed bending manipulation, determines a screen activation region and a screen inactivation region with reference to the bending line BL, and performs an operation corresponding to each region. The above-described operation of the controller 130 may be implemented by executing various programs stored in the storage device 140.

Figure 18:
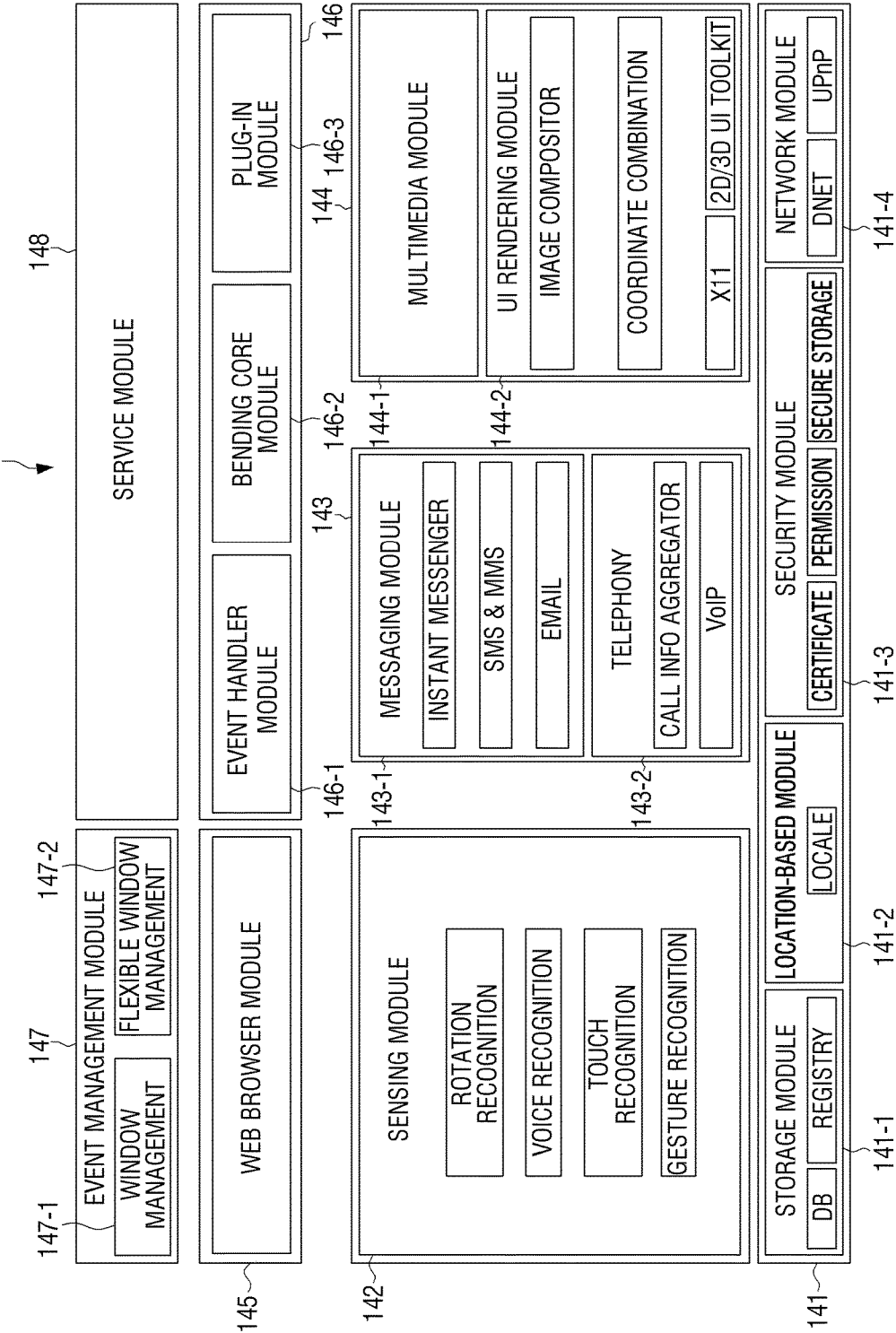
FIG. 18 is a view illustrating a structure of a storage to support operations of the controller according to an exemplary embodiment of the present general inventive concept.

FIG. 18 is a view illustrating a hierarchy of the storage device 140. Referring to FIG. 18, the storage device 140 may store software including a base module 141, a sensing module 142, a communication module 143, a presentation module 144, a web browser module 145, a bending event handling module 146, an event management module 147, and a service module 148.

The base module 141 refers to a base module that processes signals transmitted from the flexible display apparatus 100, and transmits the signals to an upper layer module (not illustrated).

The base module 141 includes a storage module 141-1, a location-based module 141-2, a security module 141-3, and a network module 141-4.

The storage module 141-1 is a program module that manages a database (DB) or a registry. The main CPU 132 may access the database in the storage device 140 using the storage module 141-1 and may read out various data. The location-based module 141-2 is a program module that is interlocked with hardware such as a GPS chip and supports a location-based service. The security module 141-3 is a program module that supports certification for hardware, permission of a request, and a secure storage, and the network module 141-4 includes a Distributed.net (DNET) module and a Universal Plug and Play (UPnP) module as a module to support network connection.

The sensing module 142 is a module that collects information from various sensors included in the sensor 110, analyzes and manages the collected information. Specifically, the sensing module 142 is a program module that detects manipulation attributes such as coordinate values of a touch point, a touch moving direction, a moving speed, and a moving distance. The sensing module 142 may include a face recognition module, a voice recognition module, a motion recognition module, an NFC recognition module, a rotation recognition module, a touch recognition module, and a gesture recognition module.

The communication module 143 is a module to communicate with an external apparatus. The communication module 143 includes a messaging module 143-1 such as an instant messenger program, a short message service (SMS) and multimedia message service (MMS) program, and an email program, and a telephony module 143-2 which includes a call information aggregator program module and a voice over internet protocol (VoIP) module.

The presentation module 144 is a module that generates a display screen. The presentation module 144 includes a multimedia module 144-1 to reproduce multimedia content and output the multimedia content, and a user interface (UI) rendering module 144-2 to process a UI and graphics. The multimedia module 144-1 may include a player module, a camcorder module, and a sound processing module. Accordingly, the multimedia module 144 generates a screen and a sound by reproducing various multimedia contents, and reproduces the same. The UI rendering module 144-2 may include an image compositor module to combine images, a coordinate combination module to combine coordinates on a screen to display an image and generate coordinates, an X11 module to receive various events from hardware, and a 2D/3D UI toolkit to provide a tool to configure a UI of a 2D or 3D format.

The web browser module 145 is a module that performs web-browsing and accesses a web server. The web browser module 145 may include a web view module to render and view a web page, a download agent module to download, a bookmark module, and a web-kit module.

The bending event handling module 146 is a module that, if a bending gesture (corresponding to a bending of the flexible display 110) is made, controls an operation according to the bending gesture. The bending event handling module 146 includes an event handler module 146-1, a bending core module 146-2, and a plug-in module 146-3. The event handler module 146-1 receives various events from a flexible window management module 147-2 of the event management module 147, and classifies the events according to priority. The event recited herein is an event in which a bending gesture is sensed. The bending core module 146-2 queues the events classified by the event handler module 146-1 and matches the event with a corresponding program (application or widget). Also, the bending core module 146-2 transmits a rendering event signal to the presentation module 144 through the plug-in module 146-3 to render a screen matching the event. The plug-in module 146-3 is connected to the presentation module 144 or a flexible UI frame work module (not illustrated) and loads data.

The event management module 147 is a module that manages a touch or bending gesture, or other various events. The event management module 147 includes a window management module 147-1 and the flexible window management module 147-2. The window management module 147-1 may sense a touch event sensed by the touch sensor or may sense an input event input through other inputting means. The window management module 147-1 transmits the sensed event to the presentation module 144 or the flexible UI frame work module (not illustrated) such that an operation corresponding to the event is performed. If a bending gesture is sensed by the sensor 120, the flexible window management module 147-2 transmits the bending event to the bending event handling module 146.

The service module 148 is an application module that provides various services. The service module 148 may include a program module of providing various services such as a navigation program module, a game module, an e-book module, a calendar module, and a notice management module.

The main CPU 132 displays a main screen if the flexible display apparatus 100 is turned on or if a lock state is released. The main screen displays various icons. The main CPU 132 executes the UI rendering module 144-2 and provides various base data to adjust a display state of a bending interaction guide to the image processor 133. The base data may be shape, location, size, color and display time of the bending interaction guide. As described above, the image processor 133 generates the bending interaction guide, adds the bending interaction guide to an object of the flexible display 110, and displays the bending interaction guide.

Some of the various program modules illustrated in FIG. 18 may be omitted, changed or added according to a type or characteristic of the flexible display apparatus 100.

In the above exemplary embodiments of the present general inventive concept, the flexible display apparatus 100 has a flat shape. However, the flexible display apparatus 100 may be embodied in various shapes. For example, the flexible display apparatus 100 may be embedded in a body that is formed of an inflexible material.

Figure 19:
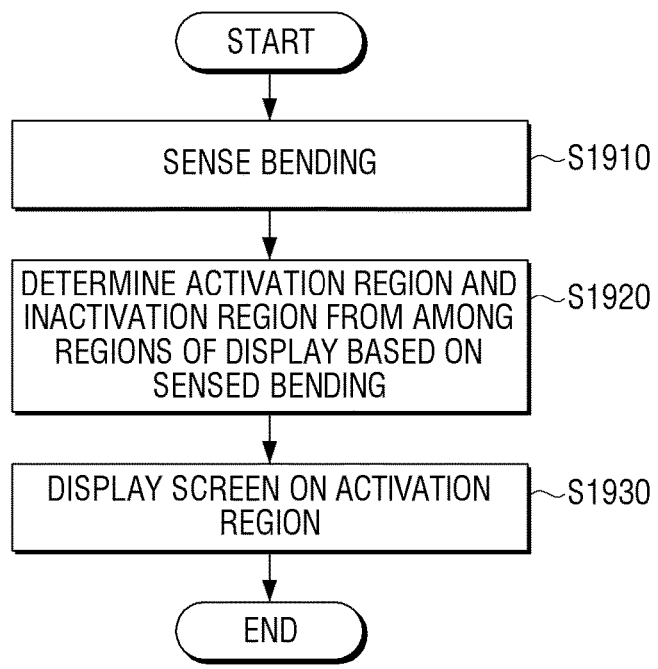
FIG. 19 is a view illustrating a display method of a flexible display apparatus according to an exemplary embodiment of the present general inventive concept.

FIG. 19 is a view illustrating a display method of a flexible display apparatus 100 according to an exemplary embodiment of the present general inventive concept.

According to the display method of the flexible display apparatus 100 illustrated in FIG. 19, bending of the flexible display 110 included in the flexible display apparatus 100 is sensed (operation S1910).

Based on the sensed bending, a screen activation region and a screen inactivation region are determined from among display regions of the flexible display (operation S1920). Specifically, a bending line BL which is formed by the sensed bending is detected. The bending line BL is defined by a line that connects points at which the greatest degree of bending is performed in a bent area. For example, a line connecting bending points at which the greatest resistance value is output from a bend sensor (also called "bending coordinates") is defined as a bending line BL.

A region that is formed by the detected bending line BL and at least two of the four sides of the flexible display 110 may be determined as a screen activation region, and the remainder of the flexible display 110 may be determined as a screen inactivation region. For example, a region that is formed by two points at which a bending line BL meets first and second sides of the flexible display 110 which are adjacent to each other, and a vertex at which the first and second sides meet each other may be determined as a screen activation region, and the remainder of the flexible display 110 may be determined as a screen inactivation region. For another example, a region that is formed by two points at which a bending line BL meets two sides of the flexible display 110 which are opposite each other, and two vertexes at which the two sides meet a third side connecting the first two sides may be determined as a screen activation region, and the remainder of the flexible display 110 may be determined as a screen inactivation region.

Next, a screen is displayed on the screen activation region (operation S1930). Also, the screen inactivation region may be turned off.

If bending is performed in a state in which an original screen is displayed on the entire flexible display 110 in operation S1930 the original screen may be reconfigured according to a size and a shape of the determined screen activation region, and may be displayed on the screen activation region. Alternatively, a part of the original screen displayed on the entire flexible display 110 that corresponds to the size and the shape of the screen activation region may be displayed on the screen activation region. An example of this situation is illustrated in FIG. 33, discussed later.

Also, if the screen activation region is determined, a number of executable functions may be determined with reference to the size and the shape of the determined screen activation region, and the determined number of functions may be executed from among the plurality of functions according to a priority given to the plurality of functions in operation S1930. Also, a screen including an object corresponding to each of the executed functions may be generated and may be displayed on the screen activation region. In this case, the priority of functions may be determined differently according to a location of the screen activation region. An example of this situation is illustrated in FIG. 23, discussed later.

Also, if the screen activation region is determined, a function that matches the location of the screen activation region may be identified based on information on at least one function matching each region of the flexible display 110 and stored in operation S1930. Next, the identified function may be executed and a screen may be generated, and the generated screen may be displayed on the screen activation region.

If a region matching a plurality of functions is included in the screen activation region, the number of functions to be executed may be determined according to the size and the shape of the screen activation region, and the determined number of functions may be executed from among the plurality of functions in sequence according to the priority given to the plurality of functions in operation S1930. Next, a screen including an object corresponding to each of the executed functions may be generated and the generated screen may be displayed on the screen activation region. An example of this situation is illustrated in FIG. 23, discussed later.

In operation S1930, in a state in which one application is executed and an execution screen of the application is displayed on the entire region of the flexible display 110, if a notice message regarding a second application is received, the notice message may be displayed on one region of the execution screen. Examples of this situation are illustrated in FIGS. 26 and 27, discussed later.

Also, if the region on which the notice message is displayed is bent, the execution screen of the application is displayed on the remainder of the flexible display 110, and a whole text of the notice message may be displayed on the bent region. This situation is illustrated for example in FIG. 26, discussed later.

Also, if flap manipulation to unfold the bent region is sensed in the state in which the whole text of the notice message is displayed on the bent region, the second application may be executed and an execution screen of the second application may be displayed on the entire flexible display 110. This situation is illustrated for example in FIG. 27, discussed later.

Also, if the flexible display apparatus 100 is re-bent in the state in which the execution screen of the second application is displayed on the entire flexible display 110, a sub-function that corresponds to the re-bent region from among sub-functions executable by the second application may be executed. This situation is illustrated for example in FIG. 27, discussed later.

If the flexible display apparatus 100 is re-bent in a direction opposite to the bending direction of the region on which the notice message is displayed, the notice message may be deleted and the execution screen of the application may be displayed on the entire flexible display 110 again. This situation is illustrated for example in FIG. 26, discussed later.

If the bent region returns to a flat state, the flexible display apparatus 100 may enter a standby state. This situation is illustrated for example in FIG. 28, discussed later.

Also, if the flexible display 110 returns to the flat state after having been bent from one end to such an extent that one end contacts the other end, the screen activation region may be extended to the entire region of the flexible display 110.

Display Methods According to Exemplary Embodiments of the Present General Inventive Concept FIGS. 20A-D are views illustrating a method of determining a screen activation region according to an exemplary embodiment of the present general inventive concept.

As illustrated in FIG. 20A, if folding and hold manipulation is performed on a bent region of the flexible display 110, a region A that is formed by a bending line BL and two sides adjacent to the bending line BL may be determined as a screen activation region, and the other region may be determined as a screen inactivation region. The method of determining the screen activation region will be explained separately according to a case in which the flexible display 110 has a one-sided display and a case in which the flexible display 110 is a double-sided display.

If the flexible display 110 is a one-sided display, a surface including the screen activation region A is a front surface of the flexible display 110 that displays a screen, and the opposite surface of the flexible display 110 corresponds to a rear display surface. In this case, the front except for the region A may be the screen inactivation region.

If the flexible display 110 is a double-sided display, the screen activation region A may be a rear surface of the flexible display 110 and a rear surface region that is not illustrated is also the screen inactivation region. Additionally, the entire region of the front surface of the flexible display 110, that is, the region illustrated in FIG. 20A and the region that is overlapped with the region A and thus is not illustrated, may be the screen inactivation region.

Figure 20B:
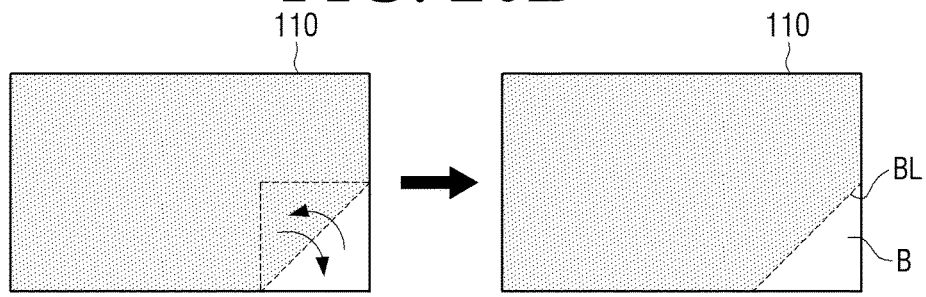

If folding and flap manipulation (in which a portion of the flexible display 110 is folded over and then folded back to its original position) is performed on the bent region of the flexible display 110 as illustrated in FIG. 20B, a region B that is formed by the bending line BL and the two sides adjacent to the bending line BL may be a screen activation region. In this case, the remainder of the flexible display 110 except for the region B may be a screen inactivation region.

Figure 20C:
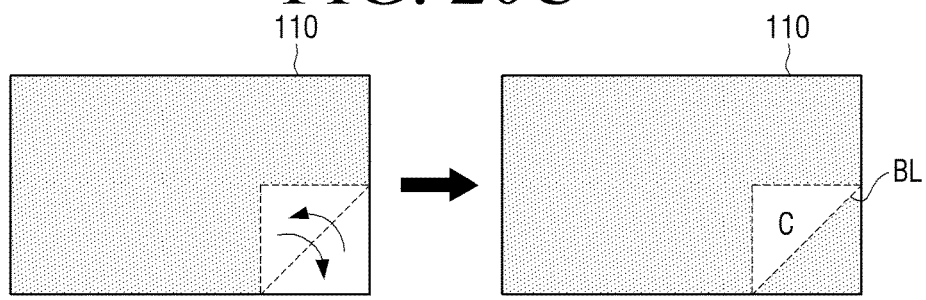

If folding and flap manipulation is performed on the bent region of the flexible display 110 as illustrated in FIG. 20C, only a region C that has not experienced location movement from among regions that have contacted each other by folding may be a screen activation region, and the remainder of the flexible display 110 may be a screen inactivation region.

Figure 20D:
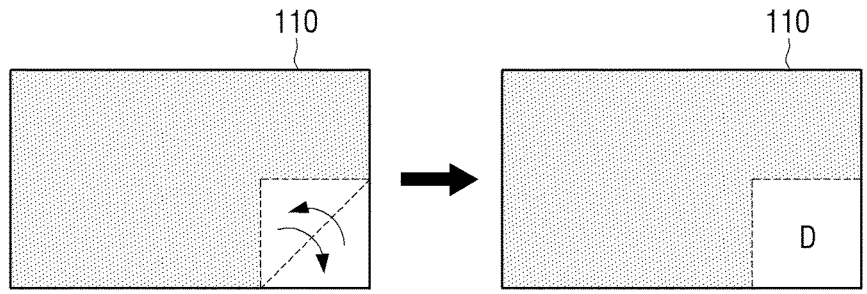

As illustrated in FIG. 20D, if folding and flap manipulation is performed on the bent region of the flexible display 110, a region D corresponding to the portions of the flexible display 110 that have been folded over and contacted each other may be a screen activation region, and the remainder of the flexible display 110 may be a screen inactivation region.

Figure 21A:
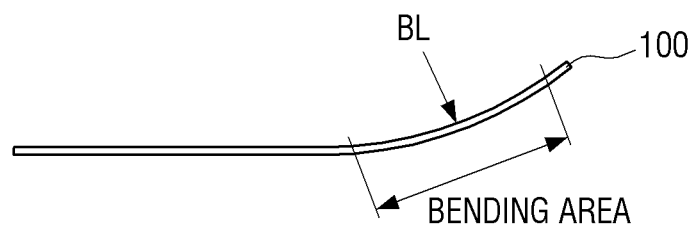
FIGS. 21A-B are views illustrating a method of recognizing a screen activation region according to an exemplary embodiment of the present general inventive concept.
Figure 21B:
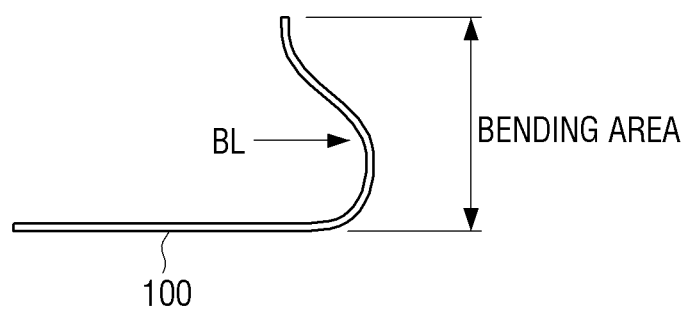

FIGS. 21A-B are views illustrating a method of recognizing a screen activation region according to an exemplary embodiment of the present general inventive concept.

As illustrated in FIGS. 21A and B, a bending area corresponding to a region that is significantly bent with reference to a bending line BL may be activated. In this case, a degree of bending for each location may be grasped based on sensing information of bend sensors (illustrated in FIGS.

3-13) disposed on the entire region of the flexible display 110, an edge region, and a center region. The bending line BL recited herein may be a virtual line that connects parts are the flexible display apparatus 100 that are most bent.

If bending is performed as illustrated in FIG. 21A, a region that is significantly bent with reference to a bending line BL may be recognized as a screen activation region.

Also, if bending is performed as illustrated in FIG. 21B, a region that is significantly bent with reference to a bending line BL may be recognized as a screen activation region. Besides the bend sensor described above, a pressure sensor or a touch sensor may be used to recognize a screen activation region, and an acceleration sensor (illustrated in FIG. 15) or a gyro sensor may be disposed on a specific region (for example, a corner) of the flexible display apparatus 100 to recognize a screen activation region.

FIGS. 22A-B are views illustrating a method of displaying a screen on a screen activation region according to a bending manipulation method according to an exemplary embodiment of the present general inventive concept.

If folding and hold is performed on a certain region in a state in which the flexible display 110 is inactivated as illustrated in FIG. 22A, a screen may be displayed on a region A that is determined as an activation region by the folding and hold manipulation. The displayed screen may correspond to a function allocated to the region A. For example, if a clock function is allocated to the region A, an application execution screen corresponding to the function may be displayed.

If folding and flap is performed on a certain region in the state in which the flexible display 110 is inactivated as illustrated in FIG. 22B, a screen may be displayed on a region B that is determined as a screen activation region by the folding and flap manipulation. In this case, a screen corresponding to a function allocated to the region B may be displayed. For example, if a weather information providing function is allocated to the region B, an application execution screen corresponding to the function may be displayed. That is, even if the region A of FIG. 22A is the same as the region B of FIG. 22B (that is, even if the region A of FIG. 22A is the one-sided display as illustrated in FIG. 20A, a different function may be executed according to a bending manipulation method. That is, a different function may be executed according to whether folding and hold is performed or folding and flap is performed, and a corresponding different screen may be displayed.

FIGS. 23A-E are views illustrating a method of displaying according to a shape of a screen activation region according to an exemplary embodiment of the present general inventive concept.

As illustrated in FIGS. 23A and B, the same elements constituting a screen may be rearranged according to a shape of a screen activation region and may be displayed. That is, if a screen activation region 231 has a rectangular shape as illustrated in FIG. 23A, application icons may be displayed to be suitable for the corresponding region. If a screen activation region 232 has a triangular shape as illustrated in FIG. 23B, application icons may be rearranged to be suitable for the corresponding region and may be displayed.

Figure 23C:
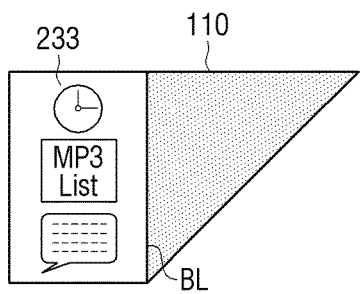
Figure 23D:
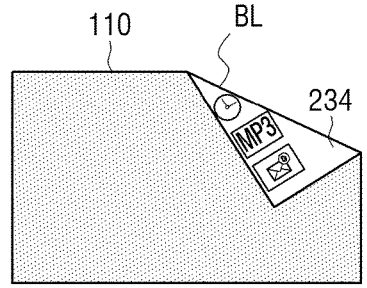
Figure 23E:
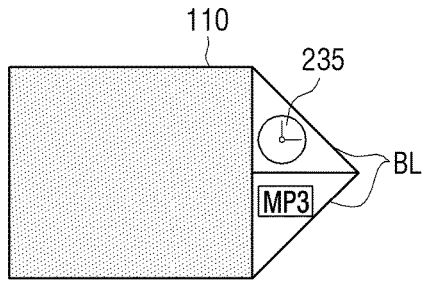

The screen activation regions 233, 234, and 235 may have various shapes according to bending shapes as illustrated in views FIGS. 23C, D, and E, and corresponding application icons may be rearranged and displayed according to a size and a shape of the screen activation region.

FIGS. 24A-E and 25A-H are views illustrating a method of displaying according to a size and a location of a screen activation region according to an exemplary embodiment of the present general inventive concept.

In the exemplary embodiment of FIGS. 24A-E and 25A-H, it is assumed that a screen activation region is determined by folding and flap performed on a certain region in a state in which the flexible display 110 is inactivated.

As illustrated in FIGS. 24A-E and 25A-H, a kind of a function to be executed, a number of functions, and a shape of an execution screen may vary according to size, shape, and location of a screen activation region.

Figure 24A:
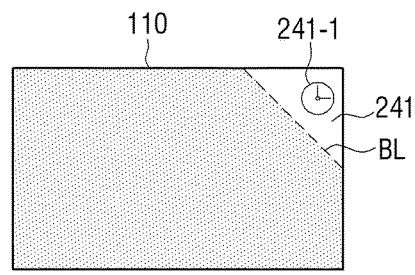
FIGS. 24A-E and 25A-H are views illustrating a method of displaying according to a size and a location of a screen activation region according to an exemplary embodiment of the present general inventive concept.

If a screen activation region 241 is determined by folding and flap as illustrated in FIG. 24A, a clock function pre-set for the screen activation region 241 is executed and a screen corresponding to the clock function is displayed. The screen corresponding to the function may be a screen on which an application icon is displayed or an execution screen of the corresponding application. For the convenience of explanation, a corresponding application icon 241-1 is displayed.

Figure 24B:
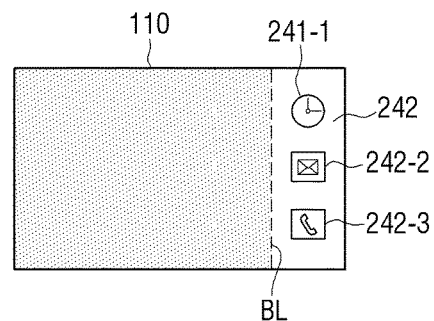

Specifically, if a size of a screen activation region 242 illustrated in FIG. 24B is larger than that of the screen activation region 241 of FIG. 24A, the number of executable functions increases. For example, a message application icon 242-2 and a telephone application icon 243-1 may be displayed besides the clock application icon 242-1.

In this case, the executed functions may be determined according to pre-stored priority. For example, it is determined that three functions are executable on the screen activation region 242, the three functions that are determined from among the plurality of functions according to priority are executed and a screen including objects corresponding to the functions may be displayed. The priority may be determined differently according to a location of the screen activation region.

Figure 24C:
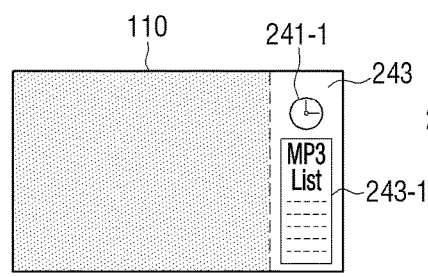

According to another exemplary embodiment of the present general inventive concept, if a screen activation region 243 is determined as in FIG. 24C, a number of executable functions are determined for the determined screen activation region 243 according to priority.

Specifically, if an execution screen for a function that is given second priority is so large that it is impossible to display an execution screen for a function given next priority as illustrated in FIG. 24C, only the two functions which are given first and second priorities are executed on the screen activation region 243.

Figure 24D:
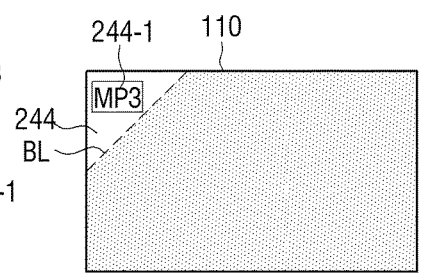

Also, if a location of a screen activation region 244 illustrated in FIG. 24D is different from that of the screen activation region 241 of FIG. 24A, a function different from the function executed in FIG. 24A may be performed. For example, a pre-set mp3 function may be executed on the screen activation region 244 and an mp3 application icon 244-1 may be displayed.

Figure 24E:
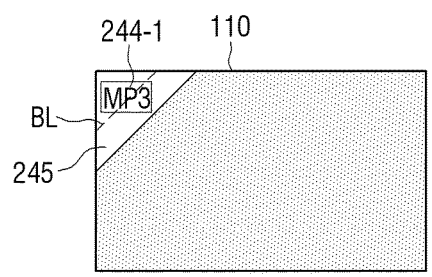

If a size of a screen activation region formed by a bending line BL is not appropriate to display a screen corresponding to a corresponding function as illustrated in FIG. 24E, for example, if the size of the screen activation region formed by the bending line BL is smaller than a predetermined size, the screen activation region may be extended to such an extent that a corresponding screen can be displayed. That is, a screen activation region 245 exceeding the bending line BL may be determined.

Figure 25A:
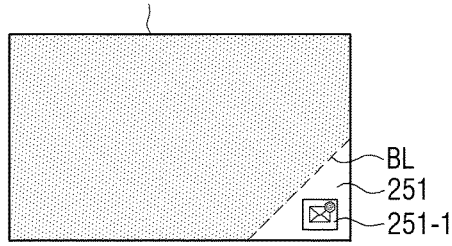

Also, a shape of an execution screen corresponding to the same function may vary according to a size of a screen activation region as illustrated in FIGS. 25A and B.

If a size of a screen activation region 251 is smaller than a predetermined size as illustrated in FIG. 25A, an application icon of a corresponding function may be displayed. For example, a message icon 251-1 may be displayed as show in FIG. 25A, and an execution screen for the message icon 251-1 may be displayed by selecting the message icon 251-1 or enlarging the size of the screen activation region 251.

Figure 25B:
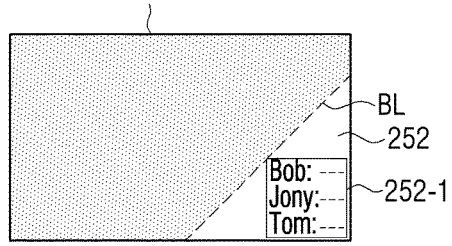

If a size of a screen activation region 252 is greater than the predetermined size as illustrated in FIG. 25B, an application execution screen 252-1 of a corresponding function may be displayed. For example, an execution screen of a message application may be displayed as illustrated in FIG. 25B.

A screen that is more detailed than the execution screen may be displayed by enlarging the size of the screen activation region 252. For example, message senders are displayed to such an extent that they can only be identified in FIG. 25B. However, a message text may be displayed by enlarging the size of the screen activation region 252. A detailed operation of enlarging the size of the screen activation region 252 will be explained below with reference to the drawings.

Figure 25C:
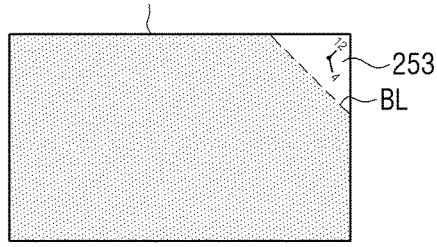
Figure 25D:
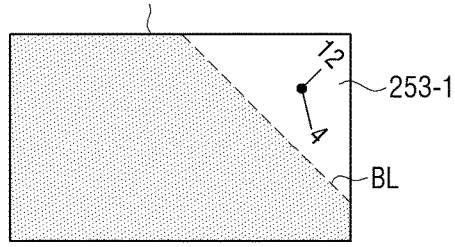

Also, as illustrated in FIGS. 25C and D, a size of information provided on an execution screen corresponding to the same function may vary according to a size of a screen activation region. For example, if time information is provided on a screen activation region 253, 253-1, a size of the time information may vary according to a size of the screen activation region 253, 253-1.

Figure 25E:
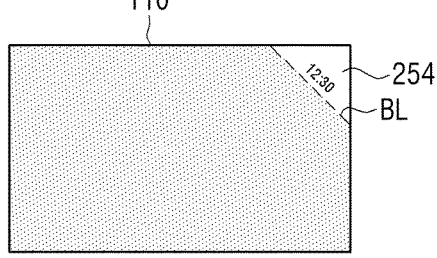
Figure 25F:
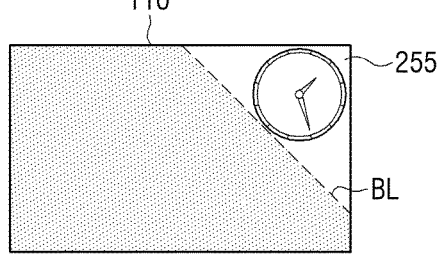

Also, as illustrated in FIGS. 25E and F, a shape of information provided on an execution screen corresponding to the same function may vary according to a size of a screen activation region. For example, if screen activation regions 254 and 255 provide the same time information, the time information may be provided in a form of a text on the screen activation region 254 of FIG. 25E, and the time information may be provided in a form of a clock image on the screen activation region 255 of FIG. 25F.

Figure 25G:
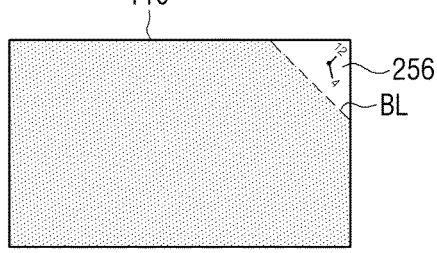

Also, as illustrated in FIGS. 25G and H, an amount of information provided on a screen activation region may vary according to a size of the screen activation region. If a plurality of pieces of information is provided according to a size of a screen activation region, the plurality of pieces of information may be information on the same function or may be information on different functions.

Figure 25H:
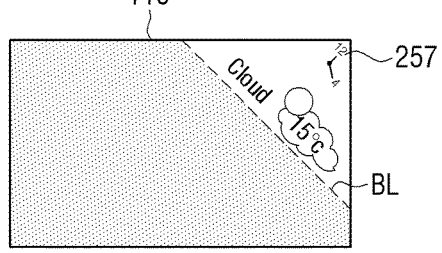

For example, time information may be provided on a screen activation region 256 illustrated in FIG. 25G, and time information and weather information may be provided on a screen activation region 257 illustrated in FIG. 25H.

In the above exemplary embodiments of the present general inventive concept, a certain region is activated by bending the flexible display 110 while it is in the inactivation state. However, this is merely an example. In the state in which the entire screen is activated, a certain region may be maintained in the activation state by bending, and the remainder of the screen may be inactivated.

Figure 26:
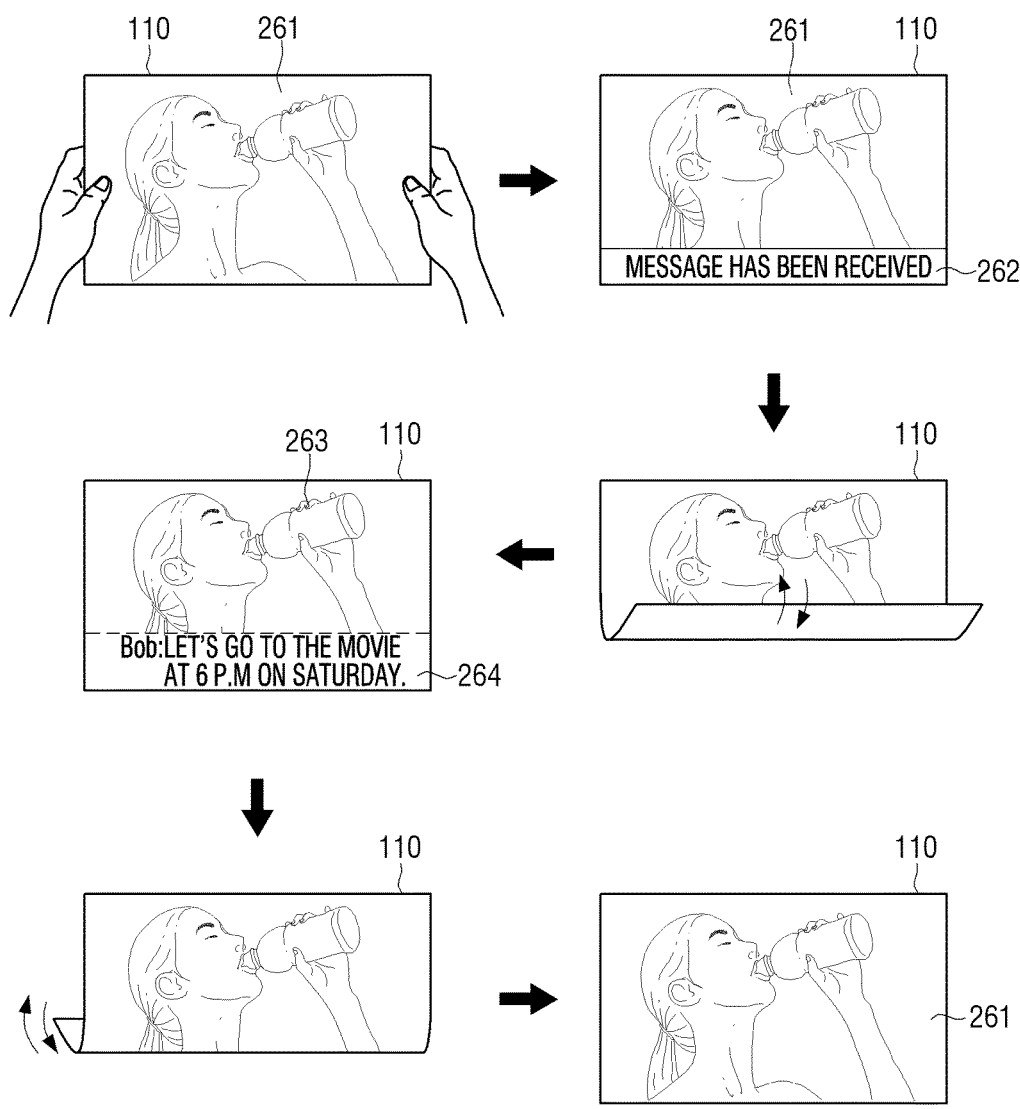
FIGS. 26 and 27 are flowcharts illustrating a display method according to an exemplary embodiment of the present general inventive concept.
Figure 27:
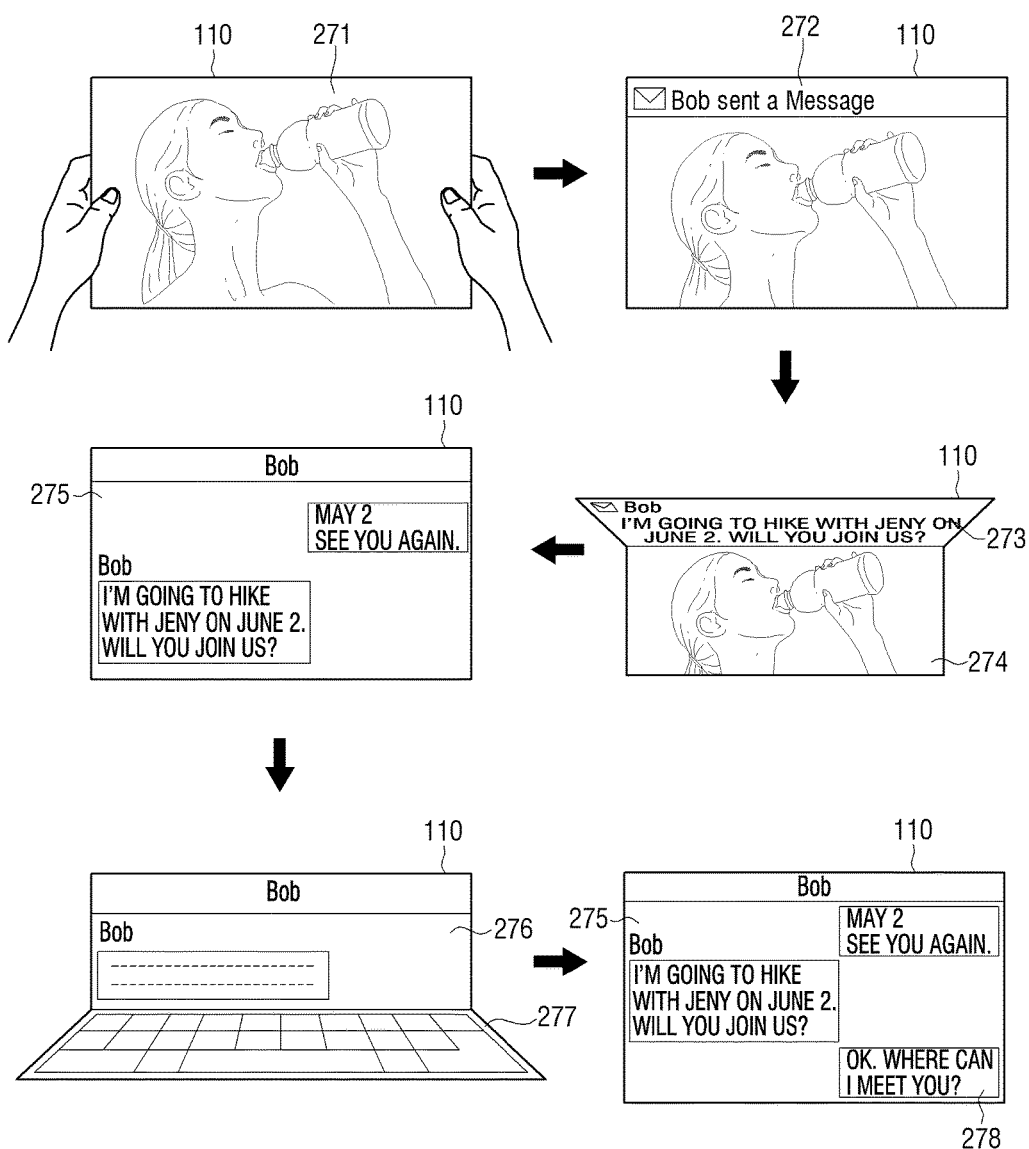

FIGS. 26 and 27 are flowcharts illustrating a display method according to an exemplary embodiment of the present general inventive concept.

In the exemplary embodiment illustrated in FIGS. 26 and 27, it is assumed that, in a state in which a screen is already activated in one form, a bent region is activated in the other form.

According to an exemplary embodiment illustrated in FIG. 26, in a state in which an execution screen 261 of a specific first application is displayed on the flexible display 110, if a notice message regarding a second application is received, the notice message 262 may be displayed on one region of the execution screen. For example, in a state in which a moving image reproducing screen 261 is displayed by executing a moving image application, if a notice message regarding a message application is received, the notice message 262 informing that a message is received is displayed on one region of the execution screen.

If fold and flap manipulation is performed on the region on which the notice message 262 is displayed, the execution screen of the first application is maintained on region 263 separate from a region 264 on which fold and flap manipulation is sensed, and a whole text of the notice message may be displayed on the region 264 on which bending and flap manipulation is sensed. For example, a whole text 264 of the received message may be displayed.

If bending and flap manipulation is performed in the opposite direction on the region 264 on which bending and flap manipulation has been sensed, the whole text 264 of the message that has been displayed on the region 264 may disappear and the execution screen of the previous application, that is, the moving image reproducing screen 261 may be displayed on the entire flexible display 110 again.

FIG. 27 is a flowchart illustrating a display method according to an exemplary embodiment of the present general inventive concept.

According to an exemplary embodiment illustrated in FIG. 27, in a state in which an execution screen 271 of a specific first application is displayed on the entire flexible display 110, if a notice message regarding a second application is received, the notice message 272 may be displayed on one region of the execution screen.

Next, if the region on which the notice message 272 is displayed is bent, the execution screen of the first application is displayed on the region 274 outside of the bent region 273 and a whole text of the notice message may be displayed on the bent region 273.

If flap manipulation to unfold the bent region is sensed in the state in which the whole text of the notice message is displayed on the bent region 273, the second application may be executed and an execution screen 275 of the second application may be displayed on the entire flexible display 110.

Also, if a certain region 276 is bent in the state in which the execution screen of the second application is displayed on the entire flexible display 110, the execution screen of the second application may be displayed on the bent region 276 and a sub-function for the execution screen of the second application may be executed on the other region 277. For example, if the execution screen of the second application is a message application execution screen, a keyboard function to input a message may be displayed on the other region 277.

If flap manipulation is sensed on the bent region 276 on which the execution screen of the second application is displayed, the execution screen 275 of the second application may be displayed on the entire screen again. For example, if a message is input through the keyboard screen 277, a screen reflecting a newly input message 278 may be displayed.

Figure 28:
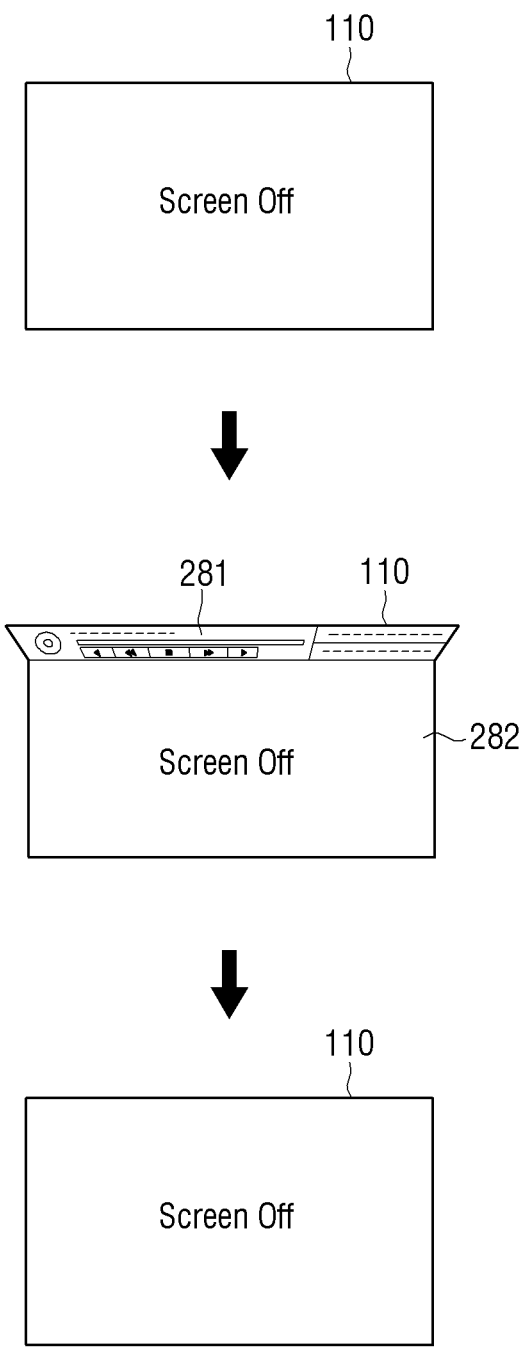
FIG. 28 is a view illustrating a display method according to an exemplary embodiment of the present general inventive concept.

FIG. 28 is a flow chart illustrating a display method according to still an exemplary embodiment of the present general inventive concept.

If a certain region 281 of the flexible display 110 is bent by more than a predetermined radius of curvature while the flexible display 110 is in a standby state (screen off) as illustrated in FIG. 28, an execution screen for a function corresponding to the region 281 may be displayed and the other region 282 may remain in the standby state. For example, a summary screen corresponding to a music player function may be displayed on the region 281.

If flap manipulation to make the bent region 281 completely flat is sensed, the entire flexible display 110 goes back to the standby state.

Figure 29:
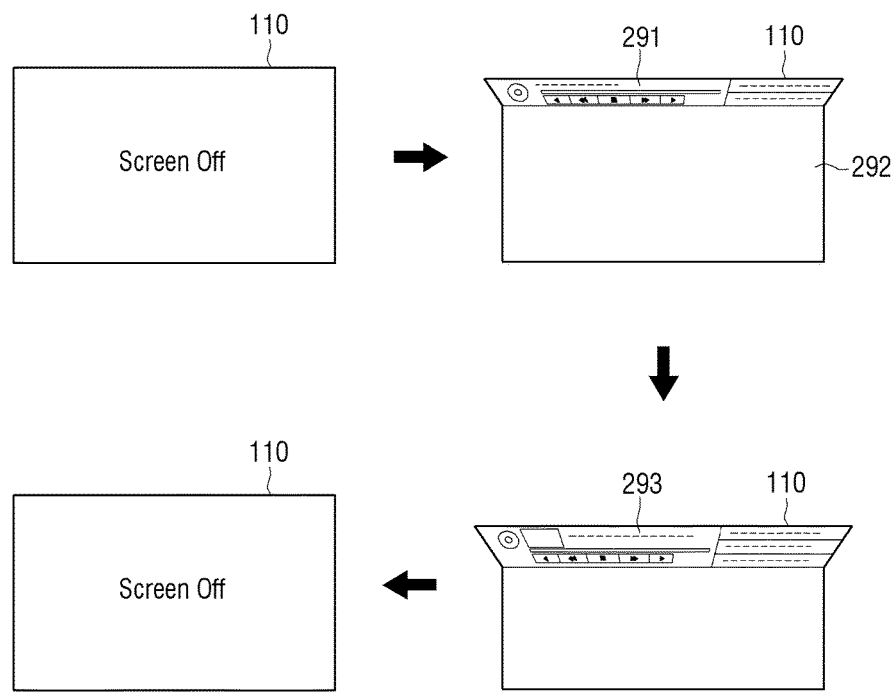
FIG. 29 is a view illustrating a display method according to an exemplary embodiment of the present general inventive concept.

FIG. 29 is a flowchart illustrating a display method according to an exemplary embodiment of the present general inventive concept.

If bending of a certain region 291 of the flexible display 110 is sensed in a state in which the flexible display 110 is in a standby (screen off) state as illustrated in FIG. 29, the bent region 291 is activated and an execution screen for a function corresponding to the bent region 291 is displayed, and the other region 292 remains in the standby state.

If re-bending of resulting in a new bent region 293 is sensed, the screen activation region may be extended or reduced according to the new bent region 293, and a screen corresponding to the extended or reduced screen activation region may be displayed. Specifically, if the screen activation region 293 determined by the bending line BL formed by the re-bending manipulation is larger than the screen activation region 291 determined by the bending line BL formed by the initial bending manipulation, much information or detailed information may be displayed on the extended screen activation region. For example, more information may be displayed on the extended screen activation region 293 than in the initial screen activation region 291 as illustrated in FIG. 29.

If the flexible display apparatus 100 is released from the bending state and returns to the flat state, the screen activation region 293 may be inactivated and thus the entire flexible display 110 may enter the standby state.

FIG. 30 is a flowchart illustrating a display method according to an exemplary embodiment of the present general inventive concept.

If bending of a certain region 301 is sensed while the flexible display 110 is in the standby state as illustrated in FIG. 30, the bent region 301 is activated and an execution screen for a function corresponding to the bent region 301 is displayed, and the other region 302 remains in the standby state.

If the bent region is extended to the entire region by user manipulation, the entire screen may be activated and a corresponding screen may be displayed. For example, if the user grips the bending line BL and moves a location of the bending line BL continuously, the screen activation region may be extended according to movement of the bending line BL.

In this case, as the screen activation region is extended, a display state of the screen displayed on the screen activation region may be changed. Specifically, if a summary screen of a music player is displayed on the screen activation region 301 according to initial bending manipulation, detailed information corresponding to the extended screen activation region 303 such as an entire screen of the music player and information on a currently reproduced album may be displayed on the screen activation regions which are extended according to the movement of the bending line BL.

Figure 31:
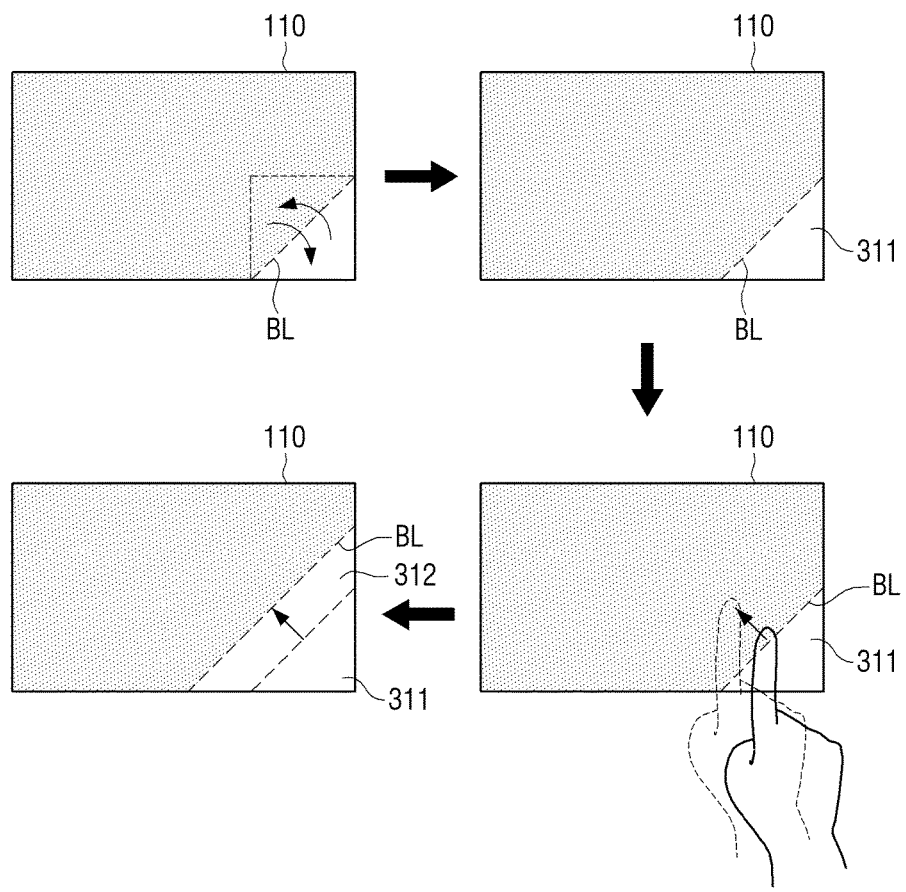
FIG. 31 is a view illustrating a method of adjusting a screen activation region according to an exemplary embodiment of the present general inventive concept.

FIG. 31 is a flowchart illustrating a method of adjusting a screen activation region 311, 312 according to an exemplary embodiment of the present general inventive concept.

As illustrated in FIG. 31, if bending of a certain region 311 is sensed in a state in which the flexible display 110 is in a standby state, a bent region 311 from among a plurality of regions divided by a bending line BL is activated as a screen activation region. After that, the screen activation region 311 may be extended or reduced by touching and dragging the bending line BL. For example, if the user touches the bending line BL and drags to move the location of the bending line BL, the screen activation region may be extended to a region 312 to which the bending line BL is moved.

FIGS. 32A and B are flowcharts illustrating a method of displaying according to an adjusted screen activation region 321, 322, 323, and 324 according to an exemplary embodiment of the present general inventive concept.

As illustrated in FIG. 32, if a certain region 321 of the flexible display apparatus 100 is activated and the activation region 321 is extended by touching and dragging, detailed information of existing display information may be displayed on an extended screen activation region 322 or the enlarged existing display information may be displayed For example, if a message icon 321-1 including an update mark 321-2 is displayed on the existing screen activation region 321 as illustrated in FIG. 32A, detailed contents 322-1 of three messages corresponding to the update mark 321-2 of the message icon 321-1 may be displayed on the extended screen activation region 322.

If weather information 323-1 is displayed on the existing screen activation region 323 as illustrated in FIG. 32B, the existing display information may be displayed in an extended form on the extended screen activation region 324.

Figure 34:
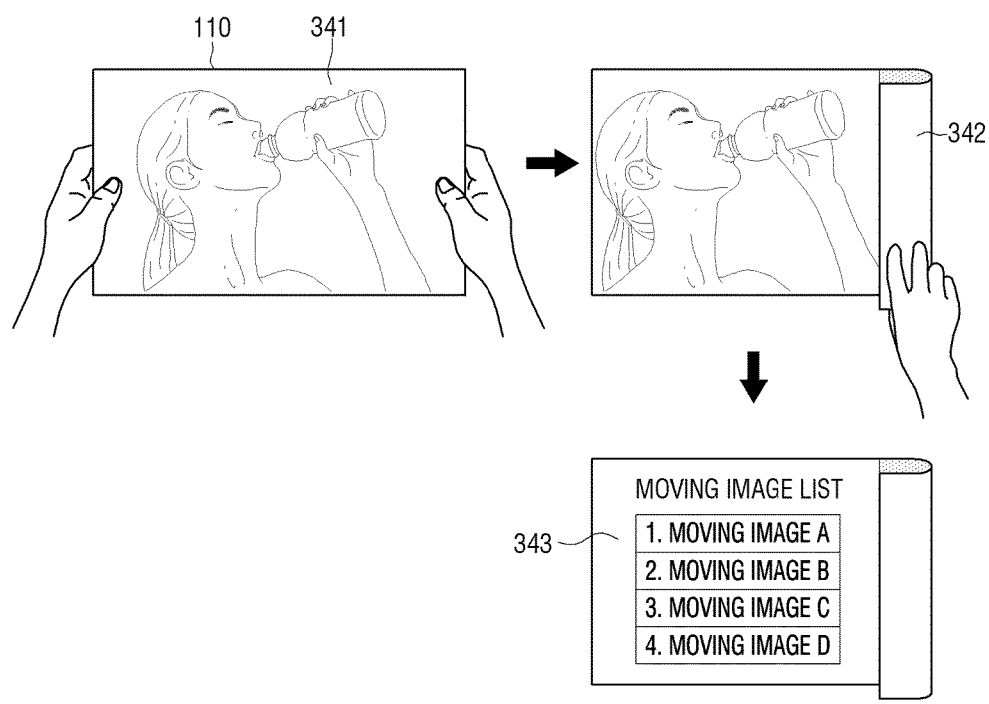

FIGS. 33 and 34 are flowcharts illustrating a screen inactivating method according to an exemplary embodiment of the present general inventive concept.

If a certain region 332 or 342 is inactivated by bending as illustrated in FIGS. 33 and 34, respectively, such that region 332 or 342 becomes a screen inactivation region, a content that has been displayed on the screen inactivation region 332 or 342 or a content associated with the content that has been displayed on the screen inactivation region 332 or 342 may be displayed on the screen activation region 333 and 343.

For example, it is assumed that a screen activation region 331 corresponding to the entire flexible display 110 of the flexible display apparatus 100 is activated and a music player screen 331-1 and information on a currently reproduced album 331-2 are displayed.

If bending of a certain region 332 of the flexible display 110 is sensed, the music player screen 331-1 that has been displayed inside the bent region 332 is moved to the region 333 where bending is not performed and some of the information 331-2 on the current produced album which has been originally displayed is moved in the other region. In this case, the inner screen corresponding to the bent region 332, that is, the region that is not exposed due to bending may be inactivated.

In the exemplary embodiment of the present general inventive concept illustrated in FIG. 34, it is assumed that a screen activation region 341 corresponding to the entire flexible display 110 of the flexible display apparatus 100 is activated and a moving image reproducing screen is displayed.

Next, if bending of a certain region 342 of the flexible display 110 is sensed, the moving image reproducing screen that has been displayed on a region 343 on which bending is not performed may disappear and a moving image reproducing list screen may be displayed. However, according to a situation, the moving image list may be overlaid with the moving image reproducing screen. Herein, the moving image reproducing list may be information on a content that has been displayed on the existing entire screen or a content that has been displayed on the bent region 342. In this case, an inner screen corresponding to the bent region 342, that is, a region that is not exposed by bending may be inactivated.

In this case, a display state of the screen that is displayed on the screen activation region may be changed as the screen activation region is extended. Similarly to the method illustrated in FIG. 30, if a summary screen of a music player is displayed on a screen activation region 301 according to initial bending manipulation, detailed information corresponding to extended region 303 such as an entire screen of the music player and information on a currently reproduced album may be displayed on the screen activation region 303 extended by movement of a bending line BL.

Figure 35:
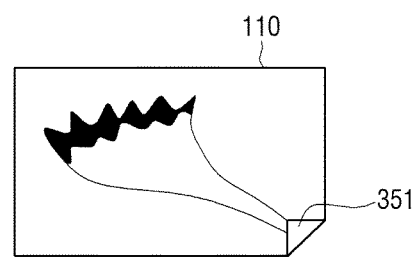
FIG. 35 is a view illustrating a display method according to an exemplary embodiment of the present general inventive concept.

FIG. 35 is a view illustrating a display method according to an exemplary embodiment of the present general inventive concept.

If a certain region 351 of the flexible display 110 is bent as illustrated in FIG. 35, a graphic effect showing that contents that have been displayed on the flexible display 110 are minimized and disappear toward a location of the bent region 351 may be provided. For example, the contents displayed on the flexible display 110 may be deleted and thrown away by executing a recycle bin function or a previous content displayed on the flexible display 110 may disappear to be converted into another content.

Figure 36A:
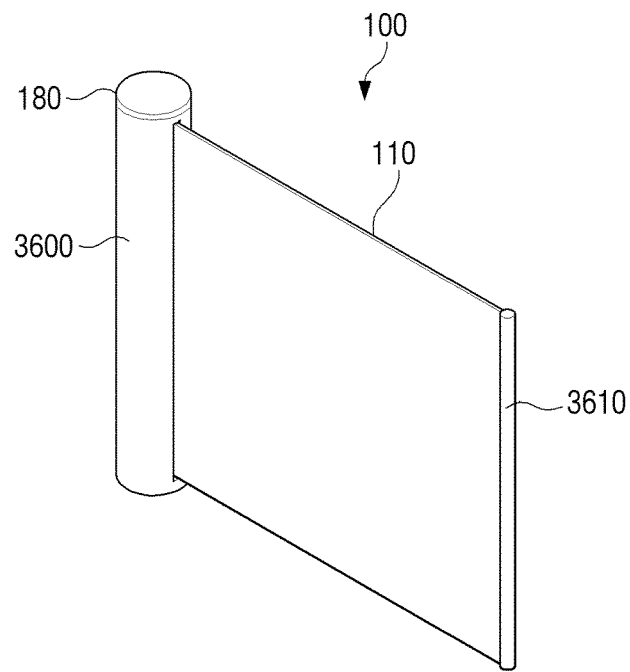
FIGS. 36A-B are views illustrating an example of a flexible display apparatus which is embedded in a body.
Figure 36B:
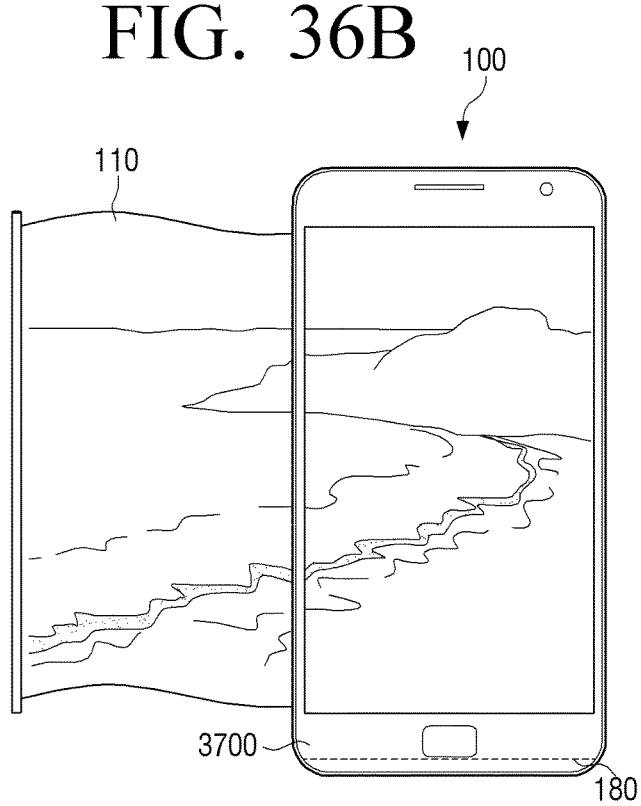

FIGS. 36A-B are views illustrating an example of a flexible display apparatus 100 which is embedded in a body 3600.

Referring to FIG. 36A, the flexible display apparatus 100 includes a body 3600, a flexible display 110, and a grip unit 3610.

The body 3600 may serve as a kind of a case containing the flexible display 110. If the flexible display apparatus 100 includes various elements as illustrated in FIG. 36, elements other than the flexible display 110 and some sensors may be mounted in the body 3600. The body 3600 includes a rotary roller (not illustrated) to roll the flexible display 110. Accordingly, when not in use, the flexible display 110 is rolled about the rotary roller and embedded in the body 3600.

If the user holds the grip unit 3610 and pulls it, the rotary roller of body 3600 is rotated in the opposite direction to that of the rolling and rolling is released, such that the flexible display 110 comes out to the outside of the body 3600. A stopper (not illustrated) may be provided on the rotary roller. Accordingly, if the user pulls the grip unit 3610 by more than a predetermined distance, the rotation of the rotary roller is stopped by the stopper and the flexible display 110 may be fixed. Accordingly, the user can execute various functions using the flexible display 110 exposed to the outside. If the user presses a button (not illustrated) to release the stopper, the stopper is released and the rotary roller is rotated in a reverse direction. As a result, the flexible display 110 is rolled in the body 5100. The stopper may have a switch shape to stop an operation of a gear (not illustrated) to rotate the rotary roller. Since the rotary roller and the stopper may employ a general rolling structure, detailed illustration and explanation thereof are omitted.

The body 3600 may include a power supply 180. The power supply 180 may be implemented by using a battery connector (not illustrated) on which a disposable battery is mounted, a secondary cell (not illustrated) which can be charged and used multiple times by the user, and a solar cell (not illustrated) which generates electricity using solar heat. If the power supply is implemented by using the secondary cell, the user may connect the body 3600 to an external power source through a wire (not illustrated) and may charge the power supply 180.

In FIG. 36A, the body 3600 has a cylindrical shape. However, the shape of the body 3600 may be quadrangular or other polygonal shape. Also, the flexible display 110 may be implemented in various forms such as enclosing the body 3600, rather than being embedded in the body 3600 and being exposed to the outside by being pulled.

Also, as illustrated in FIG. 36B, the flexible display 110 may be configured to be inserted into a body 3700.

Figure 37:
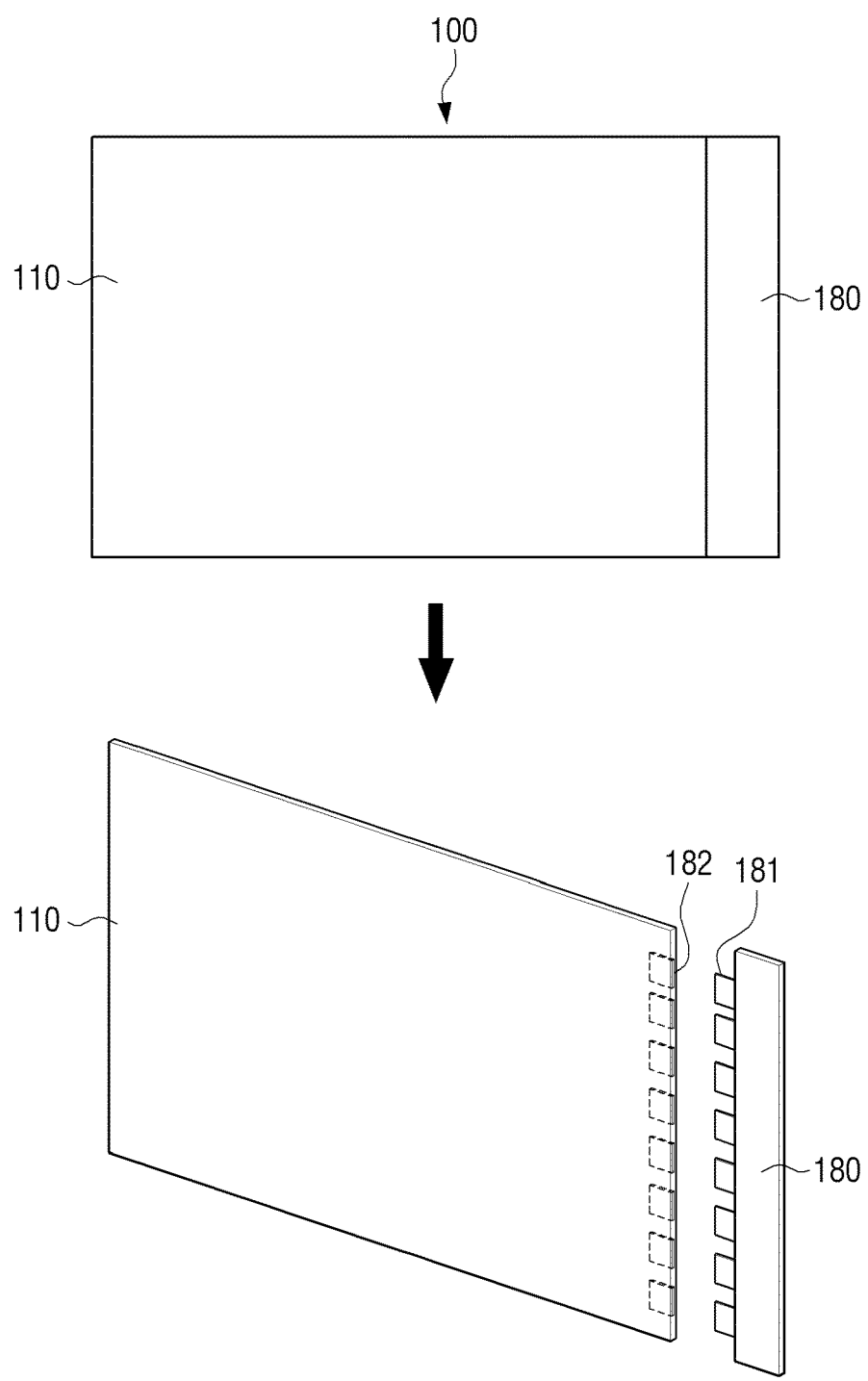
FIG. 37 is a view illustrating a flexible display apparatus including a power supply which is attachable and detachable.

FIG. 37 is a view illustrating a flexible display apparatus 100 in which a power supply 180 is attachable and detachable. Referring to FIG. 37, the power supply 180 is provided on one edge of the flexible display apparatus 100 and is attachable and detachable.

The power supply 180 may be made of a flexible material and may be bent along with the flexible display 110. Specifically, the power supply 180 includes a cathode collector (not illustrated), a cathode electrode (not illustrated), an electrolyte (not illustrated), an anode electrode (not illustrated), an anode collector (not illustrated), and a sheath covering the aforementioned members (not illustrated).

For example, the cathode collector and the anode collector may be implemented by using an alloy such as TiNi having good elasticity, metal such as copper and aluminum, a conductive material such as metal coated with carbon, carbon, and a carbon fiber, or a conducting polymer such as polypyrole.

The cathode electrode may be manufactured by a negative electrode material such as metal such as lithium, natrium, zinc, magnesium, cadmium, hydrogen storage alloy, and lead, nonmetal such as carbon, and a high molecular electrode material such as organosulfur.

The anode electrode may be manufactured by a positive electrode material such as sulfur and metal sulfide, lithium transition metal oxide such as $LiCoO_2$, and a high molecular electrode material such as $SOCl_2$, $MnO_2$, $Ag_2O$, $Cl_2$, $NiCl_2$, and $NiOOH$. The electrolyte may be implemented in a gel form using PEO, PVdF, PMMA, and PVAC.

The sheath may use a general polymer resin. For example, PVC, HDPE, or epoxy may be used. Besides these, any material that can prevent damage of a thread-type cell and is freely flexible or bendable may be used for the sheath.

Each of the anode electrode and the cathode electrode in the power supply 180 may include a connector 181 to be electrically connected to an external source.

Referring to FIG. 37, the connector 181 protrudes from the power supply 180 and a recess 182 corresponding to a location, a size, and a shape of the connector is formed on the flexible display 110. Accordingly, the power supply 180 is connected with the flexible display 110 as the connector 181 and the recess 182 are connected to each other. The connector 181 of the power supply 180 is connected to a power connection pad (not illustrated) of the flexible display apparatus 100 to supply power to the flexible display apparatus 100.

Although the power supply 180 is illustrated as attached to or detached from one edge of the flexible display apparatus 100 in FIG. 37, this is merely an example. A location and a shape of the power supply 180 may be changed according to a product characteristic. For example, if the flexible display apparatus 100 has a predetermined thickness, the power supply 180 may be mounted on a rear surface of the flexible display apparatus 100.

Figure 38:
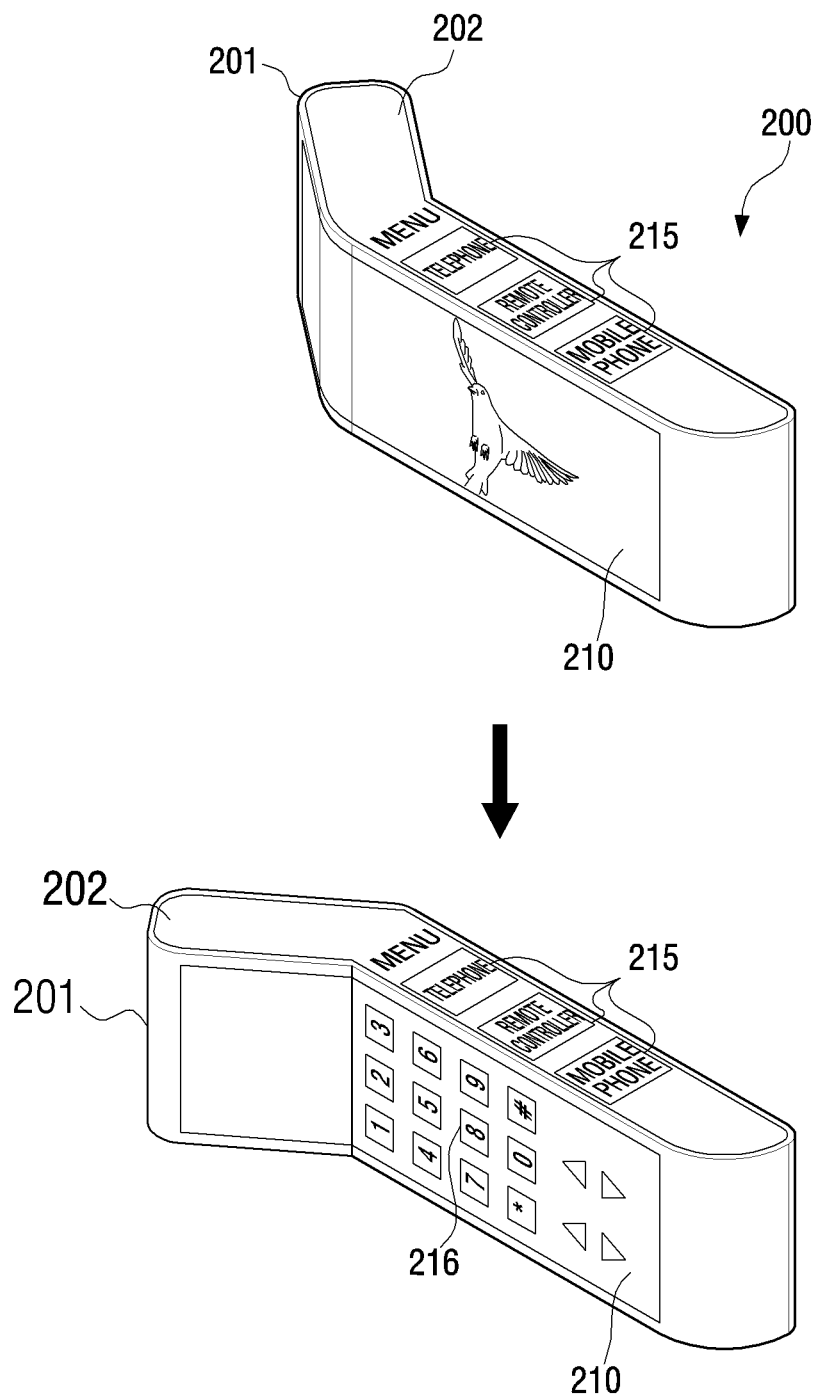
FIG. 38 and FIGS. 39A-C are views illustrating examples of a flexible display apparatus according to an exemplary embodiment of the present general inventive concept.

FIG. 38 is a view illustrating a flexible display apparatus 200 of a 3-dimensional structure rather than a flat panel structure. Referring to FIG. 38, a flexible display 210 is disposed on one side of the flexible display apparatus 200, and various hardware such as a speaker, a microphone, and an IR lamp (not illustrated) may be provided on another side. In the exemplary embodiment illustrated in FIG. 38, a plurality of buttons 215 are illustrated.

A whole outer case 201 or a part 202 of the outer case 201 of the flexible display apparatus 200 illustrated in FIG. 38 is made of rubber or other polymer resins, and is flexibly bendable. Accordingly, the whole flexible display apparatus 200 or a part of the flexible display apparatus 200 may have flexibility.

If the flexible display apparatus 200 is bent, a new operation which is different from a previous operation may be performed. For example, if the flexible display apparatus 200 usually performs a remote control function to control an external apparatus, it may perform a telephone function when a bending gesture is performed on a certain region. A remote control button (not illustrated) may be displayed on the flexible display 110 when the remote control function is performed, and a dial pad 216 may be displayed on the flexible display 110 if the telephone function is performed.

Figure 39A:
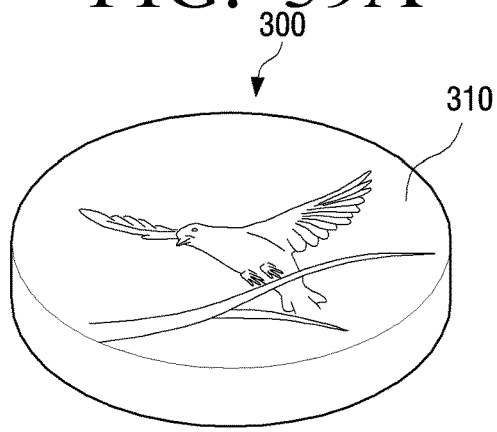
Figure 39B:
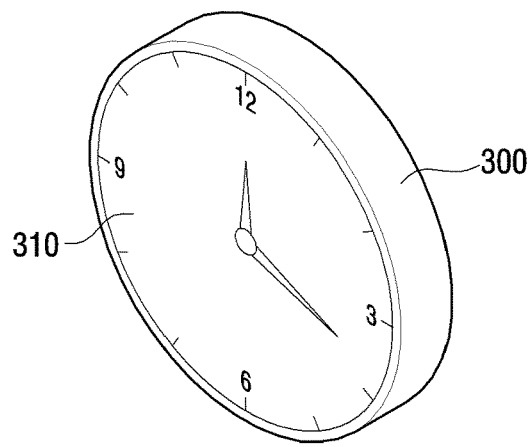
Figure 39C:
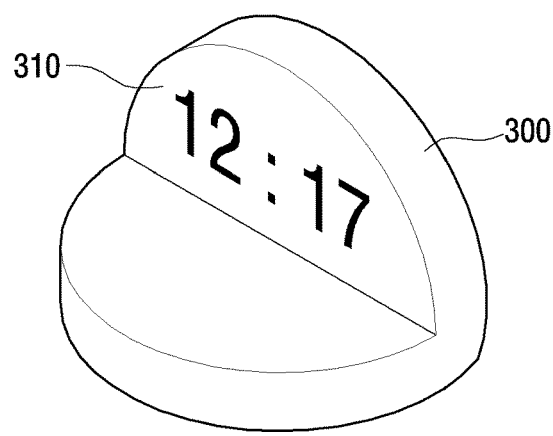

FIGS. 39A-C illustrate a circular type flexible display apparatus 300 having a flexible display 310. Accordingly, a visually or functionally different operation may be performed according to an orientation of the flexible display apparatus 300 or a shape in which the flexible display apparatus is bent. For instance, if the flexible display apparatus 300 lies horizontally as illustrated in FIG. 39A, photos or other content may be displayed. If the flexible display apparatus 300 stands in an upright position as illustrated in FIG. 39B, a clock function may be performed. If a center of the flexible display apparatus 300 is bent by 90° as illustrated in FIG. 39C, a notebook PC function may be performed. In this case, a soft keyboard may be displayed one of the folded regions and a display window may be displayed the other region.

Besides the exemplary embodiments described herein, the flexible display apparatus 100 may be embodied in various forms.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

For example, a non-transitory computer readable medium, which stores a program to perform determining a screen activation region and a screen inactivation region from among display regions of a flexible display 110 based on sensed bending, and displaying a screen on the screen activation region, may be provided.

Also, a non-transitory computer readable medium, which stores a program to perform various methods to determine a screen activation region according to the above-described various exemplary embodiments of the present general inventive concept, may be provided.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A flexible display apparatus comprising:
   a flexible display;
   a sensor; and
   a controller configured to:
      in response to a bending of the flexible display being sensed by the sensor while the flexible display is deactivated, activate a part of the flexible display among parts into which the flexible display is divided based on the bending, and
      control the flexible display to display an execution screen of a function corresponding to the activated part of the flexible display on the activated part of the flexible display.

2. The flexible display apparatus of claim 1, wherein the controller is configured to control the activated part of the flexible display to display execution screen of a function corresponding to the activated part of the flexible display.

3. The flexible display apparatus of claim 1, wherein the controller is configured to, in response to an unfolding of the flexible display being sensed by the sensor, deactivate the part of the flexible display.

4. The flexible display apparatus of claim 1, wherein the controller is configured to:
   in response to an unfolding of the flexible display, deactivate the flexible display, and
   in response to the flexible display being bent, activate the part of the flexible display and maintain the other part of the flexible display as being deactivated.

5. The flexible display apparatus of claim 1, wherein the controller is configured to, in response to another bending of the flexible display being sensed by the sensor while the flexible display is in a state of the bending, activate another part of the flexible display among parts into which the flexible display is divided based on the another bending.

6. The flexible display apparatus of claim 5, wherein the controller is configured to:
   based on the another bending of the flexible display being sensed by the sensor, control the another part of the flexible display, which is larger than the part of the flexible display and includes the part of the flexible display, to display the execution screen and additional information of the function.

7. The flexible apparatus of claim 1, wherein the controller is configured to, in response to the bending of the flexible display which corresponds to a predetermined angle being sensed by the sensor while the flexible display is deactivated, activate the part of the flexible display among parts into which the flexible display is divided based on the bending.

8. The display method of a flexible apparatus comprising a flexible display, the display method comprises:
   in response to a bending of the flexible display being sensed while the flexible display is deactivated, activating a part of the flexible display among parts into which the flexible display is divided based on the bending, and
   displaying execution screen of a function corresponding to the activated part of the flexible display on the activated part of the flexible display.

9. The display method of claim 8, further comprising:
in response to an unfolding of the flexible display being sensed, deactivating the part of the flexible display.

10. The display method of claim 8, further comprising:
in response to an unfolding of the flexible display, deactivating the flexible display, and
in response to the flexible display being bent, activating the part of the flexible display and maintaining the other part of the flexible display as being deactivated.

11. The display method of claim 8, further comprising:
in response to another bending of the flexible display being sensed while the flexible display is in a state of the bending, activating another part of the flexible display among parts into which the flexible display is divided based on the another bending.

12. The flexible display apparatus of claim 11, further comprising:
in response to the another bending of the flexible display being sensed, displaying the execution screen and additional information of the function on the another part of the flexible display, wherein the another part of the flexible display is larger than the part of the flexible display and includes the part of the flexible display.

13. The flexible display method of claim 8, further comprising:
in response to the bending of the flexible display which corresponds to a predetermined angle being sensed while the flexible display is deactivated, activating the part of the flexible display among parts into which the flexible display is divided based on the bending.

\* \* \* \* \*